US012508735B2

United States Patent

(12) United States Patent
Inoue et al.

(10) Patent No.: US 12,508,735 B2
(45) Date of Patent: Dec. 30, 2025

(54) SCARFING MACHINE

(71) Applicant: MEINAN MACHINERY WORKS, INC., Aichi (JP)

(72) Inventors: Shinya Inoue, Obu (JP); Michito Ninomiya, Obu (JP); Yasuhiro Koike, Obu (JP)

(73) Assignee: MEINAN MACHINERY WORKS, INC., Aichi (JP)

( * ) Notice: Subject to any disclaimer, the term of this patent is extended or adjusted under 35 U.S.C. 154(b) by 442 days.

(21) Appl. No.: 18/249,375

(22) PCT Filed: Nov. 9, 2021

(86) PCT No.: PCT/JP2021/041070

§ 371 (c)(1),
(2) Date: Apr. 17, 2023

(87) PCT Pub. No.: WO2022/153651

PCT Pub. Date: Jul. 21, 2022

(65) Prior Publication Data

US 2023/0382004 A1 Nov. 30, 2023

(30) Foreign Application Priority Data

Jan. 13, 2021 (JP) ................................ 2021-003220

(51) Int. Cl.
*B27D 1/10* (2006.01)

(52) U.S. Cl.
CPC ...................................... *B27D 1/10* (2013.01)

(58) Field of Classification Search
CPC ........................................................ B27D 1/10
See application file for complete search history.

(56) References Cited

U.S. PATENT DOCUMENTS 2,684,699 A * 7/1954 Upham ..................... B27F 1/16
144/134.1
5,372,168 A 12/1994 Minami
(Continued)

FOREIGN PATENT DOCUMENTS

JP H06-122101 A 5/1994
JP 2000-000804 A 1/2000
(Continued)

OTHER PUBLICATIONS

International Search Report issued in PCT/JP2021/041070; mailed Feb. 1, 2022.

*Primary Examiner* — Matthew Katcoff
(74) *Attorney, Agent, or Firm* — Studebaker Brackett PLLC

(57) ABSTRACT

Scarf faces 92*a*, 92*b* are machined at a heeling angle $\theta_2$ on a veneer 90 by adjusting the heeling angle $\theta_2$ for a desired camber h using the following Equation (1):

$$h = \frac{R}{2} \cdot \sin\theta_2 - \sqrt{\sin^2\theta_2 \cdot \frac{R^2 - t^2(1 + i^2)}{4}} \quad (1)$$

With the configuration, double cutting of the veneer 90 by a circular saw 20 can be effectively prevented. Since the camber h is set desirably, the risk can be reduced that the scarf faces 92*a*, 92*b* only partially join each other, and a space can be secured to retain an adhesive Ad between arc concavities 91, 91. Thus, when the veneers 90 are joined together at the scarf faces 92*a*, 92*b*, the adhesive Ad is unlikely to seep out onto the surfaces of the veneers 90. As a result, the scarf faces 92*a*, 92*b* can be properly joined together.

9 Claims, 27 Drawing Sheets

(56) References Cited

U.S. PATENT DOCUMENTS

| | | | |
|---|---|---|---|
| 6,112,786 | A | 9/2000 | Otsuka et al. |
| 2019/0240860 | A1 | 8/2019 | Hanses |

FOREIGN PATENT DOCUMENTS

| | | | |
|---|---|---|---|
| JP | 4275773 | B2 | 6/2009 |
| JP | 4934064 | B2 | 5/2012 |
| JP | 5683969 | B2 | 3/2015 |
| JP | 6556669 | B2 | 8/2019 |

* cited by examiner

SCARFING MACHINE

BACKGROUND

Field of the Invention

The present invention relates to a scarfing machine for machining a scarf face at an edge of a wooden board material, the edge extending in a direction intersecting the fiber direction of the board material.

Description of the Related Art

Japanese Patent Application Laid-Open No. 2000-804 (Patent Document 1) describes a scarfing machine for machining a scarf face, by a circular saw, at an edge of a wooden board material in a direction intersecting the fiber direction of the board material. In said scarfing machine, the circular saw is angled downward in the direction of machining of the scarf face (hereinafter, referred to as “heeling”).

In the above-mentioned publication, the heeling prevents the blades of the circular saw used for the scarfing from coming into contact again with the scarf face again after the machining Hence, any roughness on the scarf face is unlikely to occur.

CITATION LIST

[Patent Literature] Japanese Patent Application Laid-Open No. 2000-804

BRIEF SUMMARY

The greater the downward angle of the circular saw (hereinafter, referred to as “heeling angle”), the more reliably the blades of the circular saw used for scarfing can be prevented from coming into contact again with the scarf face after the machining (hereinafter, referred to as “double cutting”). The heeling in scarfing, however, creates a concave arc in the resulting scarf face. Also, a larger heeling angle increases a larger curvature of the concave arc. An excess curvature of the concave arc may cause the scarf face to come into only partial contact with another scarf face when these scarf faces are joined together in a post-process, resulting in poor joining. In contrast, a concave arc surface of an appropriate curvature can retain an adhesive (pocket effect), and thereby it is often preferable for a scarf face to have an appropriate arc concavity in terms of good joining with the other scarf face.

The present invention has been made in view of the above, and an object of the present invention is to provide a technique that contributes to both prevention of double cutting of a scarf face and securing of a scarf face having an appropriate arc surface.

A scarfing machine of the present invention employs the following means to achieve the above object.

According to a preferable embodiment of a scarfing machine of the present invention, a scarfing machine is configured to machine a scarf face at an edge of a wooden board material, the edge extending in a direction intersecting a fiber direction of the board material. The scarfing machine includes a holding unit, a machining unit, a supporting unit, and a driving unit. The holding unit is configured to hold the board material with at least an edge of the board material protruding. The machining unit includes a motor having a rotary shaft, and a disc cutter having a plurality of blades and connected to the rotary shaft. The machining unit is positioned such that, on a virtual projection plane when viewed from one side of the extending direction of the edge of the board material, a projection of the edge of the board material intersects with a projection of the cutter. The supporting unit is configured to support the machining unit in a state where the cutter is tilted at a first tilt angle relative to the board material so as to obtain the scarf face of a desired scarf ratio and also where the cutter is tilted at a second tilt angle relative to the board material so as to set the cutter to tilt downward in the direction of machining the scarf face. The driving unit is mechanically connected to the holding unit or the supporting unit and configured to move the holding unit relative to the supporting unit or move the supporting unit relative to the holding unit along the extending direction of the edge of the board material. The second tilt angle has a value calculated based on the relative positional relationship between a rotation axis of the cutter and the scarf face, a camber of the scarf face having an arc concavity, a scarf ratio, a diameter of the cutter, and a thickness of the board material. Accordingly, a scarf face can be machined to have a desired arc concavity. Here, the scarf ratio in the present invention is defined as a ratio between the length of the scarf face and the thickness of a board material: the length being along the fiber direction of a projection of the scarf face on a virtual projection plane when viewed from one side in the thickness direction of the board material. The phrase “connected to the rotary shaft” in the present invention preferably includes an aspect in which the cutter is directly connected to the rotary shaft as well as an aspect in which the cutter is indirectly connected to the rotary shaft. As an example of the aspect in which the cutter is indirectly connected to the rotary shaft, the cutter may be connected to the rotary shaft via a reduction gear. The “direction of machining” in the present invention means a direction intersecting the fiber direction of the board material, that is, the extending direction of the edge of the board material, and also it corresponds to the direction in which the machining of the scarf face progresses.

According to the present invention, since the cutter is angled downward at the second tilt angle in the direction of machining the scarf face, the cutting blades that have machined the scarf face can be well prevented from coming into contact again with the machined scarf face. In addition, when machining the scarf face, the cutter acts with a cutting force in a direction to press the board material into the board thickness direction, which can well decrease deformations of the board material such as warp and waviness. Furthermore, the second tilt angle has a value calculated based on the relative positional relationship between the rotation axis of the cutter and the scarf face, a camber of the scarf face with an arc concavity, a scarf ratio, the diameter of the cutter, and a thickness of the board material. Accordingly, the scarf face can be machined to have a desired arc concavity. Hence, no increase in the curvature of the scarf face having an arc concavity occurs, and the arc concavity can be appropriate. In other words, when the scarf face is joined to another scarf face in a post-process, the risk can be well reduced that the scarf faces only partially contact each other, and also the arc concavity is secured to have a curvature appropriate to retain an adhesive therein (pocket effect). As a result, the scarf faces can be well joined each other.

According to another embodiment of the scarfing machine of the present invention, the machining unit is arranged such that the rotation axis of the cutter passes through the center of the arc length of the scarf face. The second tilt angle has a value that satisfies the following Equation,

[Equation 1]

$$h = \frac{R}{2} \cdot \sin\theta_2 - \sqrt{\sin^2\theta_2 \cdot \frac{R^2 - t^2(1 + i^2)}{4}} \quad (1)$$

where $\theta_2$ is the second tilt angle, h is a desired camber of the scarf face, i is a desired scarf ratio of the scarf face, R is a desired diameter of the cutter, and t is a desired thickness of the board material. Here, the "center of the arc length" in the present invention typically corresponds to the center of the arc length of the scarf face, but preferably encompasses approximately the center of the arc length in a projection of the scarf face.

According to the present embodiment, the second tilt angle can be easily calculated for obtaining a scarf face with an appropriate arc concavity: the second tilt angle can lead to reduction in the risk that the scarf face only partially contacts with another scarf face, and also to an arc concavity that has a curvature appropriate to retain an adhesive in the scarf face (pocket effect). Since the machining unit is arranged such that the rotation axis of the cutter passes approximately through the center of the arc length of the scarf face, a component of the cutting force of the cutter, which presses the board material in the board thickness direction, can be applied to approximately the center of the arc length of the scarf face. In addition, at the center in the longitudinal direction of a slope of the scarf face, the direction in which the cutting force of the cutter acts (the direction in which the blades pass) can be almost the same as the fiber direction of the board material. As a result, when a scarf face is machined, the cutting force is less likely to act in the direction intersecting the fiber direction, which well decreases damages of the scarf face in the direction intersecting the fiber direction.

According to another embodiment of the scarfing machine of the present invention, the machining unit is arranged such that the rotation axis of the cutter passes through the tip of the scarf face. The second tilt angle has a value that satisfies the following Equations (2) to (6),

[Equation 2]

$$h_1 = h_3 \cdot \cos\alpha \quad (2)$$

$$\alpha = \sin^{-1}\left(\frac{\frac{R}{2} \cdot \sin\theta_2 - y_4}{t^2(i^2 + 1)}\right) \quad (3)$$

$$y_4 = \frac{-R\sin\theta_2 + \sqrt{R^2\sin^2\theta_2 - 4\left(1 - \frac{1}{\sin^2\theta_2}\right)\left(\frac{R^2}{4}\sin^2\theta_2 + \frac{R^2}{4} - t^2(i^2 + 1)\right)}}{2\left(1 - \frac{1}{\sin^2\theta_2}\right)} \quad (4)$$

$$h_3 = |y_5| - \left|-\frac{R}{2} \cdot \sin\theta_2\right| \quad (5)$$

$$y_5 = -\frac{R}{2} \cdot \sqrt{\tan^2\alpha + \sin^2\theta_2} \quad (6)$$

where $\theta_2$ is the second tilt angle, $h_1$ is a desired camber of the scarf face, i is a desired scarf ratio of the scarf face, R is a desired diameter of the cutter, and t is a desired thickness of the board material. Here, the "tip of the scarf face" in the present invention typically corresponds to the edge of a projection of a scarf face in the fiber direction of the board material on a virtual projection plane when viewed from one side in the thickness direction of the board material.

According to the present embodiment, the second tilt angle can be easily calculated for obtaining a scarf face with an appropriate arc concavity: the second tilt angle can lead to reduction in the risk that the scarf face only partially contacts with another scarf face, and also to an arc concavity that has a curvature appropriate to retain an adhesive in the scarf face. Since the machining unit is arranged so that a projection of the rotation axis of the cutter passes through the tip of the scarf face, the force, which is a component of the cutting force of the cutter and presses the board material in the board thickness direction, can be applied to the tip of the scarf face, the tip being the thinnest and most fragile part of the scarf face. In addition, at the tip of the scarf face, the direction in which the cutting force of the cutter acts (the direction in which the blades pass) can be almost the same as the fiber direction of the board material. As a result, at the thinnest tip of the scarf face, the cutting force is less likely to act in the direction intersecting the fiber direction, which well decreases damages of the tip of the scarf face in the direction intersecting the fiber direction.

According to another embodiment of the scarfing machine of the present invention, the plurality of blades is flat.

According to the present embodiment, all of the blades each cause a component of the cutting force to act in the direction to press the board material. Hence, deformations of the board material such as warp and waviness can be well decreased. As a result, a further improved scarf face can be obtained.

According to another embodiment of the scarfing machine of the present invention, the cutter has a first surface toward a side where a board material is placed and a second surface facing in the direction opposite to the first side. The scarfing machine further includes a first reinforcing disc that is arranged in contact with the first surface. Here, the "side where a board material is placed" is defined as a side where a board material is placed when a scarf face is machined on it by a cutter.

According to the present embodiment, the cutter is angled downward in the direction of machining a scarf face. Hence, the cutter has an enhanced stiffness against a bending force acting on the cutter. Here, the cutter is angled downward in the direction of machining of a scarf face, avoiding the first reinforcing disc from contacting the board material (scarf face).

According to another embodiment of the scarfing machine of the present invention, the scarfing machine further includes a second reinforcing disc that is arranged in contact with the second surface.

According to the present embodiment, the cutter has a further enhanced stiffness against a bending force acting on the cutter.

According to another embodiment of the scarfing machine of the present invention, the scarfing machine further includes a pressing unit positioned, in the vicinity of the cutter, upstream in the direction of machining the scarf face with respect to the cutter, the pressing unit being configured to press the board material.

According to the present embodiment, right before the machining of the scarf face at an edge of the board material, deformations such as warp and waviness of the board material can be decreased. As a result, a further improved scarf face can be obtained.

According to another embodiment of the scarfing machine of the present invention, the pressing unit is configured to line contact with the board material. The pressing unit is arranged to contact the board material in a direction intersecting the direction of machning.

According to the present embodiment, in machining a scarf face, when the supporting unit and the holding unit are caused to move relatively, the resistance between the pressing unit and the board material can be reduced, and also deformations such as warp and waviness of the board material can be well decreased right before the machining of the scarf face. As a result, a further improved scarf face can be obtained.

According to a preferable embodiment of a method of machining a scarf face of the present invention, a method of machining a scarf face at an edge of a wooden board material is configured, wherein the edge extends in a direction intersecting a fiber direction of the board material. In the method of machining a scarf face, (a) the board material is held with at least the edge of the board material protruding; (b) a disc cutter having a plurality of blades is placed such that, on a virtual projection plane when viewed from one side of the extending direction of the edge of the board material, a projection of the edge of the board material intersects a projection of the cutter; (c) a second tilt angle of the cutter with respect to the board material is calculated based on the positional relationship between a rotation axis of the cutter and the scarf face, a camber of the scarf face having an arc concavity, a scarf ratio of the scarf face, a diameter of the cutter, and a thickness of the board material, (d) the cutter is tilted relative to the board material at a first tilt angle such that the scarf face has a desired scarf ratio, and the cutter is tilted relative to the board material at the second tilt angle such that the cutter is angled downward in the direction of machining the scarf face, and (e) the board material and the cutter are relatively moved in the extending direction of the edge of the board material to machine the scarf face along the edge of the board material. Here, the scarf ratio in the present invention is defined as a ratio between the length of a scarf face and the thickness of a board material: the length being along the fiber direction of a projection of the scarf face on a virtual projection plane when viewed from one side in the thickness direction of the board material. The "direction of machining" in the present invention means a direction intersecting the fiber direction of the board material, that is, the extending direction of the edge of the board material, and it corresponds to the direction in which the machining of the scarf face progresses.

According to the present invention, since the cutter is angled downward at the second tilt angle in the direction of machining the scarf face, the cutting blades that have machined the scarf face can be well prevented from coming into contact again with the machined scarf face. In addition, when machining the scarf face, the cutter also acts with a cutting force in a direction to press the board material into the board thickness direction, which can well decrease deformations of the board material such as warp and waviness. The second tilt angle has a value calculated based on the relative positional relationship between a rotation axis of the cutter and the scarf face, a camber of the scarf face with an arc concavity, a scarf ratio, a diameter of the cutter, and a thickness of the board material. Accordingly, a scarf face can be machined to have a desired arc concavity. As a result, no increase in the curvature of the scarf face having an arc concavity occurs, and the arc concavity can be appropriate. In other words, when the scarf face is joined to another scarf face in a post-process, the risk can be well reduced that these scarf faces only partially contact each other, and also the arc concavity reliably has a curvature appropriate to retain an adhesive in the scarf faces (pocket effect). As a result, the scarf faces can be well joined to each other.

According to another embodiment of the scarfing machine of the present invention, the step (b) includes a step of placing the cutter such that the rotation axis of the cutter passes approximately through the center of the arc length of the scarf face. The step (c) is a step for calculating the second tilt angle that satisfies the following Equation,

[Equation 3]

$$h = \frac{R}{2} \cdot \sin\theta_2 - \sqrt{\sin^2\theta_2 \cdot \frac{R^2 - t^2(1 + i^2)}{4}} \tag{7}$$

where $\theta_2$ is the second tilt angle, h is a desired camber of the scarf face, i is a desired scarf ratio of the scarf face, R is a desired diameter of the cutter, and t is a desired thickness of the board material. Here, the "center of the arc length" in the present invention literally corresponds to the center of the arc length of the scarf face, but preferably encompasses almost the center of the arc length of the scarf face.

According to the present embodiment, the second tilt angle can be easily calculated for obtaining a scarf face with an appropriate arc concavity: the second tilt angle can lead to reduction in the risk that the scarf face only partially contacts with another scarf face, and also to an arc concavity appropriate to retain an adhesive in the scarf face. Since the machining unit is arranged such that the rotation axis of the cutter passes through the center of the arc length of the scarf face, a component of the cutting force of the cutter, which presses the board material in the board thickness direction, can be applied to approximately the center of the arc length of the scarf face. In addition, approximately at the center in the longitudinal direction of a slope of the scarf face, the direction in which the cutting force of the cutter acts (the direction in which the blades pass) can be almost the same as the fiber direction of the board material. As a result, when a scarf face is machined, the cutting force is less likely to act in the direction intersecting the fiber direction, which well decreases damages of the scarf face in the direction intersecting the fiber direction.

According to the present invention, it is possible to achieve prevention of double cutting of a scarf face as well as securing of the scarf face having an appropriate circular arc surface.

DETAILED DESCRIPTION

Next, the best mode for carrying out the present invention will be described using examples.

Example

Figure 1:
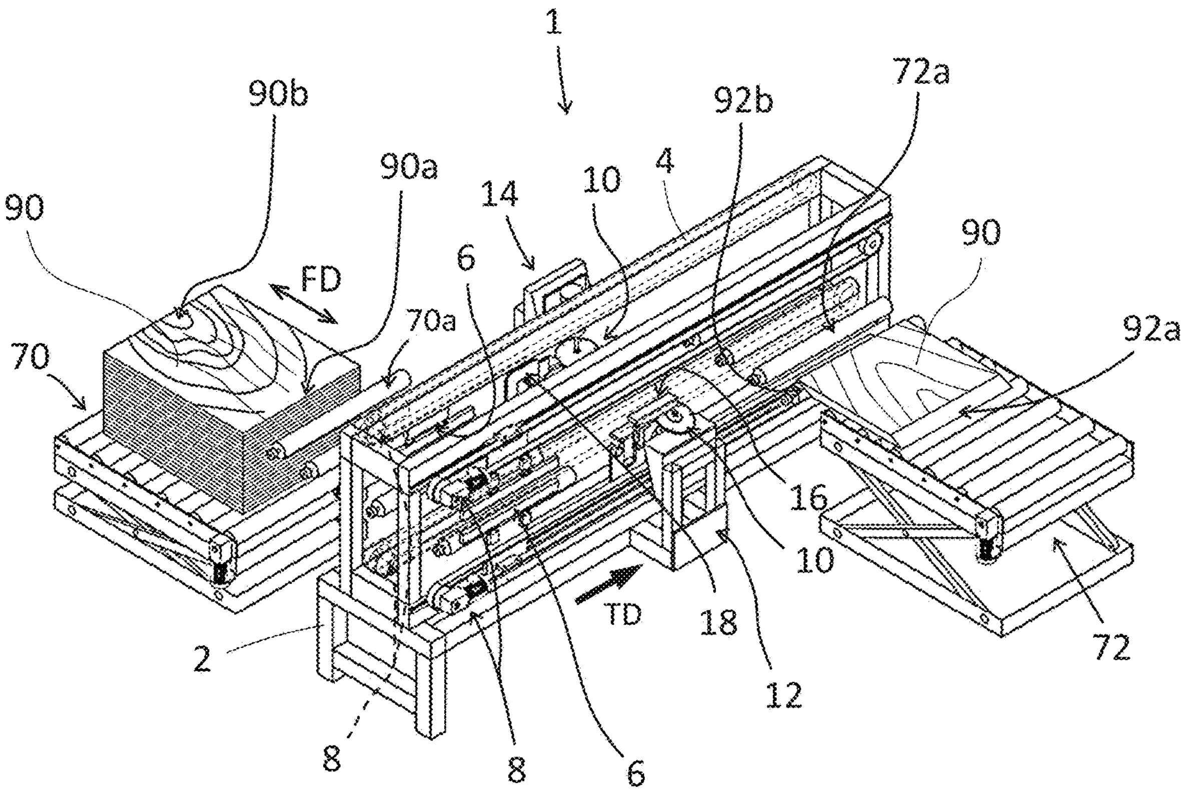
FIG. 1 is a perspective configuration diagram showing a schematic configuration of a scarfing machine 1 according to an embodiment of the present invention.

A scarfing machine 1 according to an embodiment of the present invention is configured as an apparatus for machining scarf faces 92*a*, 92*b*, respectively, on the edges 90*a*, of a veneer 90 in the fiber direction FD. As shown in FIG. 1, the scarfing machine 1 includes a base 2, a frame 4 arranged on the base 2, a pair of holding units 6, 6 slidably arranged on the frame 4, driving units 8, 8, 8, 8 arranged on the frame 4 so that the pair of holding units 6, 6 can move relative to the frame 4, a pair of machining units 10, 10 arranged on both sides of the frame 4 in the longitudinal direction of the frame 4 (so as to sandwich the frame 4), supporting units 12, 14 arranged on the base 4 so as to support the machining unite 10, 10 in a predetermined posture, pressing units 16, 18 arranged in the vicinity of the supporting units 12, 14 of the frame 4, and a control device (not shown) for controlling the entire scarfing machine 1.

As shown in FIG. 1, the frame 4 has an elongated shape in the transfer direction TD in which the veneer 90 is carried. On one end side of the frame 4 in the longitudinal direction (upstream in a transfer direction TD of the conveyor 90), a carry-in conveyor 70 is arranged, and also a carry-in roller 70*a* is arranged to carry the veneer 90 from the carry-in conveyor into the scarfing machine 1. On the other end side of the frame 4 in the longitudinal direction (downstream in the transfer direction TD of the conveyor 90), a carry-out conveyor 72 is arranged, and also a carry-out roller 72*a* is arranged to discharge the veneer 90 from the scarfing machine 1 to the carry-out conveyor 72. The carry-in roller 70*a* and the carry-out roller 72*a* are arranged so that the carry-in direction and the carry-out direction of the veneer are substantially orthogonal to the longitudinal direction of the frame 4 (the transfer direction TD of the veneer 90). The carry-in conveyor 70, the carry-in roller 70*a*, the carry-out conveyor 72 and the carry-out roller 72*a* are driven and controlled by the control device.

Figure 2:
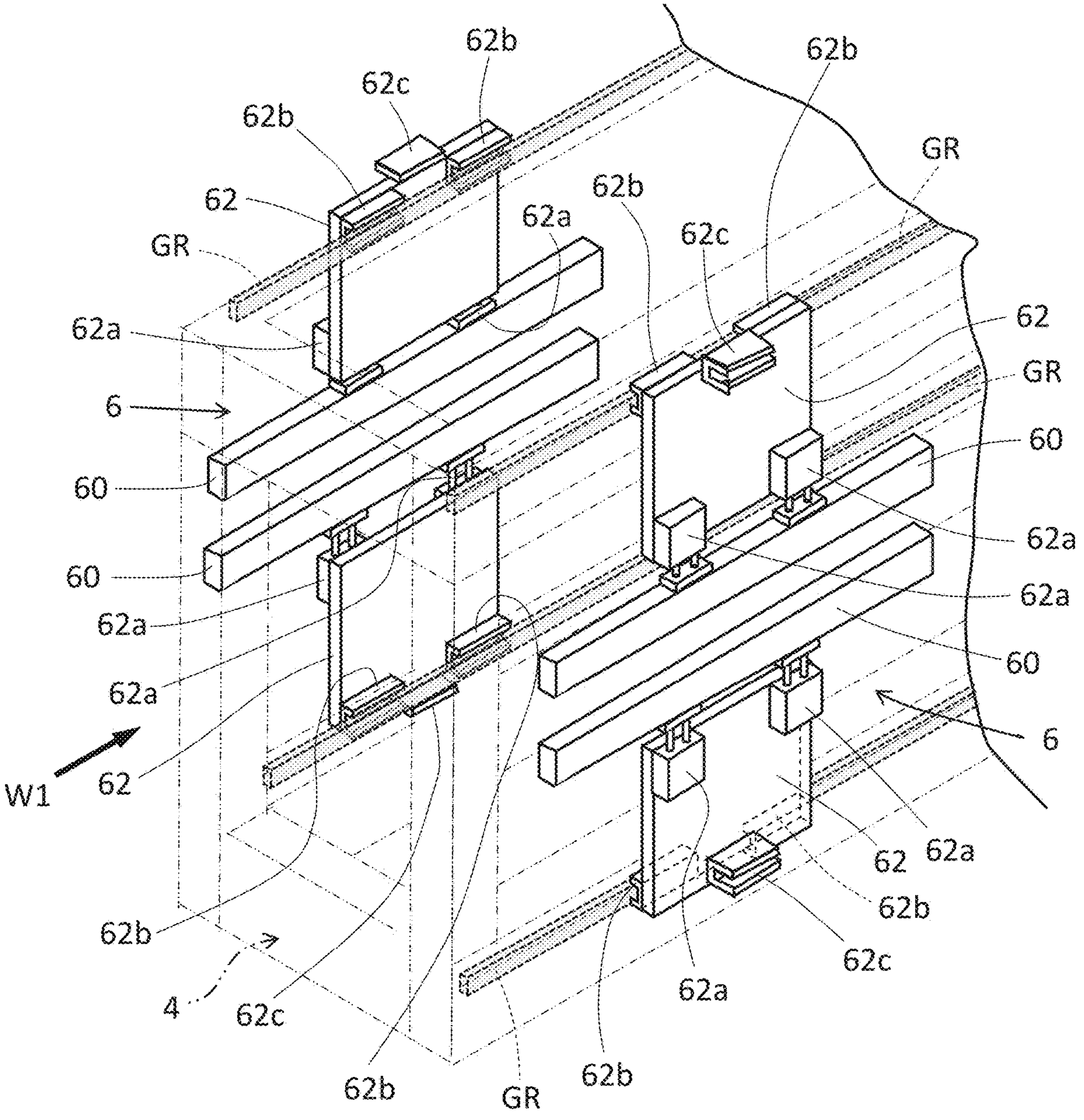
FIG. 2 is an enlarged perspective view of a main portion showing a schematic configuration of a pair of holding units 6, 6.

As shown in FIG. 2, the holding unit 6 includes a pair of upper and lower clamping bars 60, 60 parallel to each other, and a pair of main plates 62, 62 connected, respectively, to the pair of upper and lower clamping bars 60, 60 via a pair of air cylinders 62*a*, 62*a*. The holding unit 6 is configured to clamp the veneer 90 between the pair of upper and lower clamping bars 60, 60 by extending the rods (not shown) of the air cylinders 62*a*, 62*a* (see FIG. 3). The holding unit 6 is also configured to release the veneer 90 held between the pair of upper and lower holding bars 60, 60 by retracting the rods (not shown) of the air cylinders 62*a*, 62*a*. The air cylinders 62*a*, 62*a* are driven and controlled by the control device.

Figure 3:
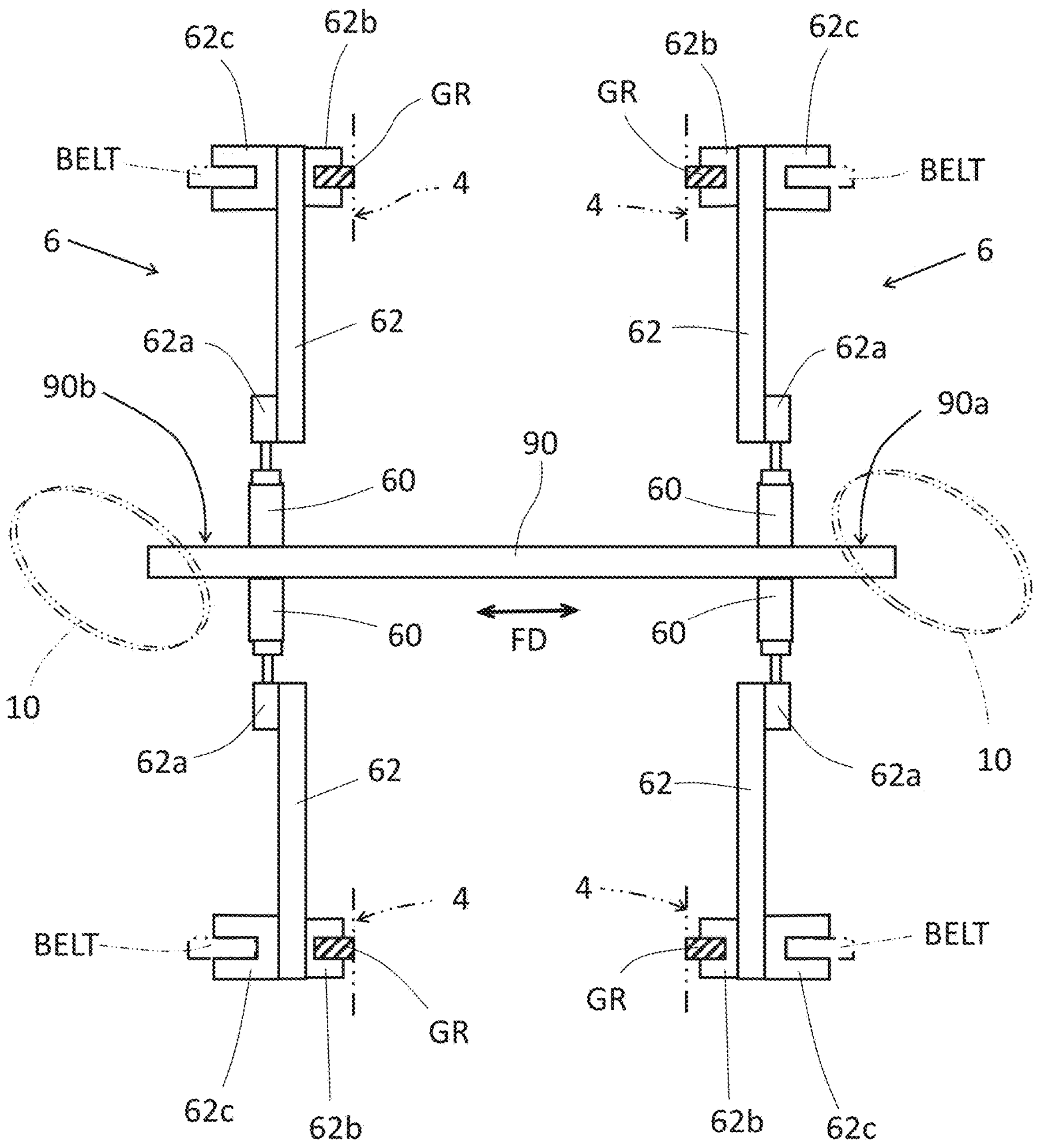
FIG. 3 is a diagram of FIG. 2 viewed in the direction of the arrow W1.

The clamping bars 60, 60 clamp the veneer 90 with both edges 90*a*, 90*b* of the veneer protruding, as shown in FIG. 3. As shown in FIGS. 2 and 3, the main plate 62 includes a pair of guide portions 62*b*, 62*b* to be engaged with a guide rail GR, and a fixing portion 62*c* to be fixed to an endless belt BELT, which will be described later, of the driving unit 8. The body plate 62 is slidably supported by the frame 4 when engaged with the pair of guide portions 62*b*, 62*b* with the guide rail GR. The fixed portion 62*c* is fixed to the endless belt BELT by a fastening member such as a bolt (not shown). The guide rail GR is mounted to the frame 4 so as to extend in the longitudinal direction of the frame 4.

Figure 4:
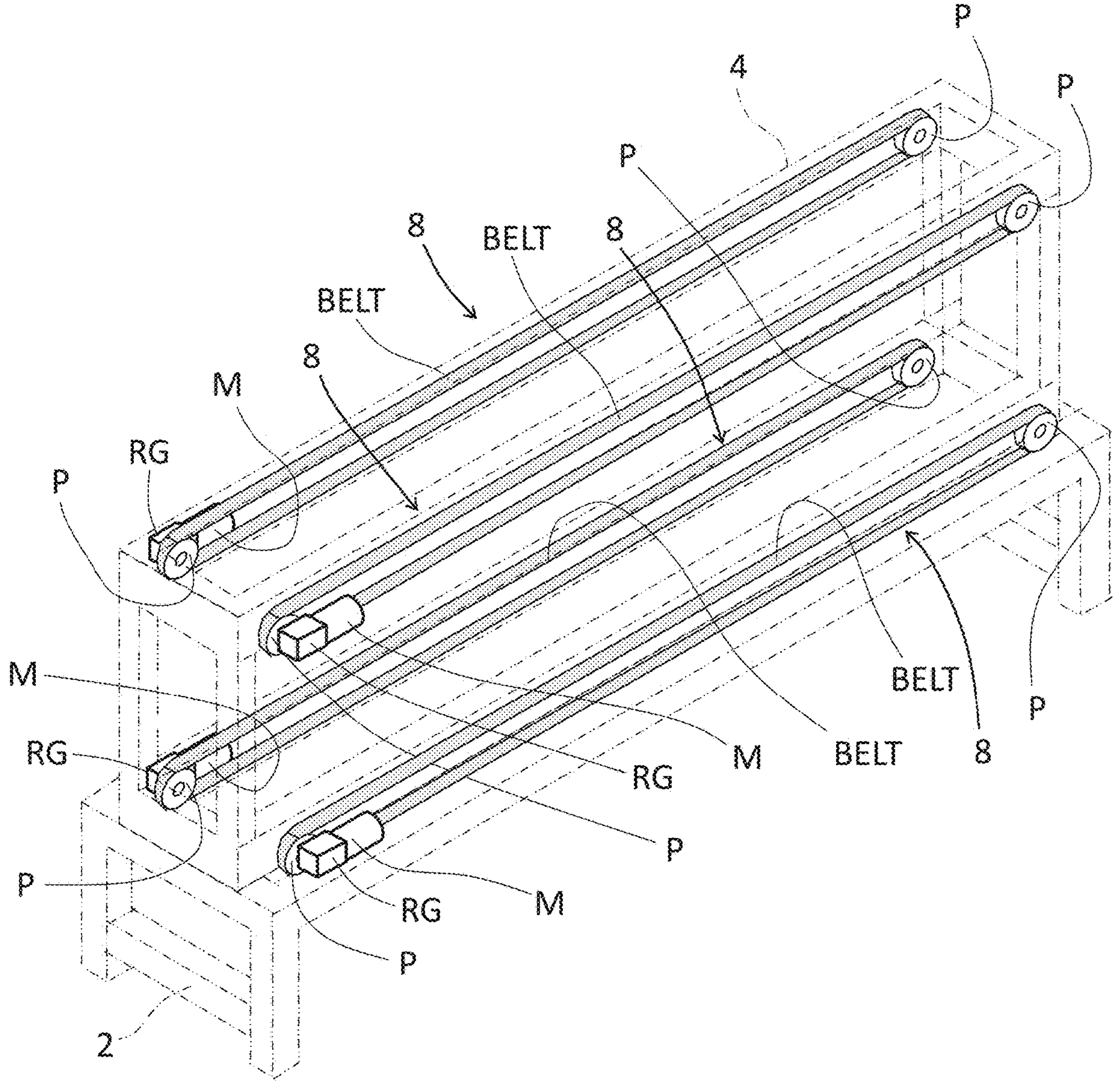
FIG. 4 is a perspective diagram showing a schematic configuration of a driving unit 8.
Figure 5:
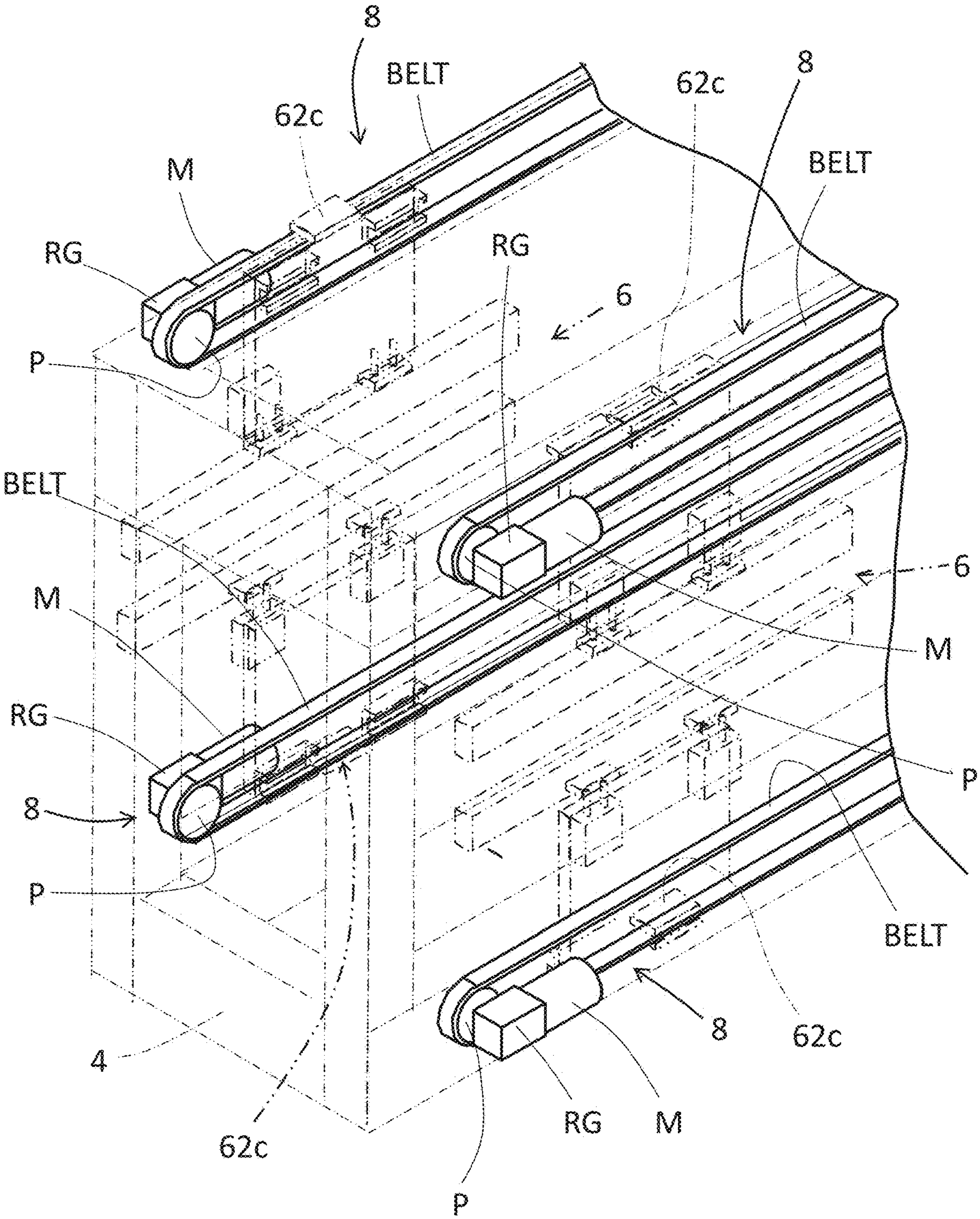
FIG. 5 is an enlarged perspective diagram of a main portion of the drive section 8.
Figure 6:
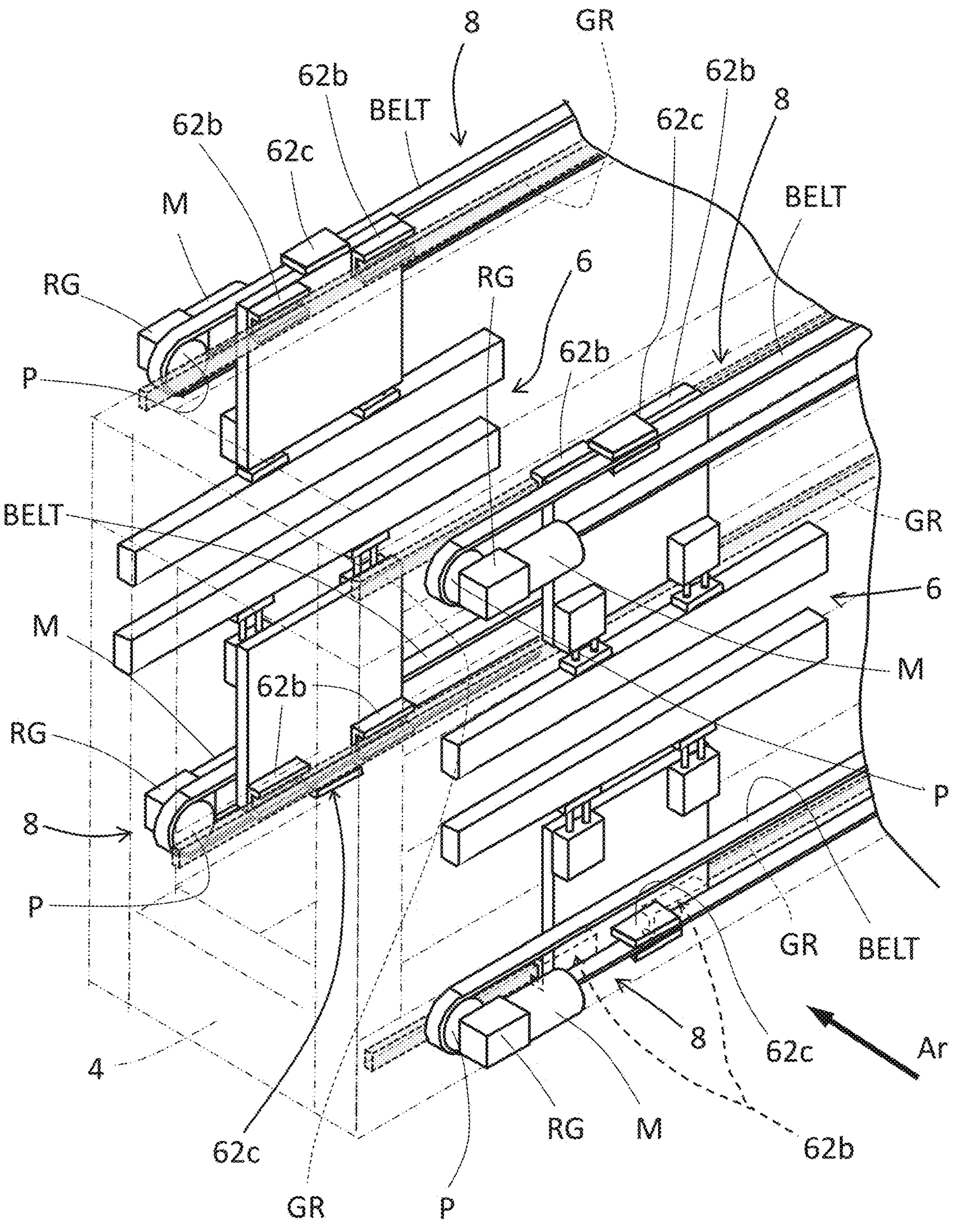
FIG. 6 is an explanatory diagram showing a connection relationship between the pair of holding units 6, 6 and the driving unit 8.

As shown in FIGS. 4 and 5, the driving unit 8 includes an endless belt BELT rotatably supported by the frame 4 via pulleys P and P, a gear mechanism RG (e.g., speed reducer) connected to a rotary shaft (not shown) of one of the pulleys, and a motor M connected to a rotary shaft (not shown) of the gear mechanism RG. The motors M, M, M, M drive one of the pulleys P, P, P, P to rotate clockwise when viewed in the direction of the arrow Ar in FIG. 6, so as to rotate the endless belt BELT clockwise. Accordingly, the pair of holding units 6, 6 fixed to the endless belts BELT, BELT, BELT, BELT via the fixing portions 62*c*, 62*c*, 62*c*, 62*c* are moved downstream in the transfer direction TD of the conveyor 90 (see FIG. 1). In contrast, the motors M, M, M, M drive the pulleys P, P, P, P to rotate counterclockwise when viewed in the direction of the arrow Ar in FIG. 6, so as to rotate the endless belt BELT counterclockwise. Accordingly, the pair of holding units 6, 6 fixed to the endless belts BELT, BELT, BELT, BELT via the fixing portions 62*c*, 62*c*, 62*c*, 62*c* are moved upstream in the transfer direction TD of the conveyor 90 (see FIG. 1). The motors M, M, M, M are synchronously controlled by the control device. The movement of the pair of holding units 6, 6 upstream and downstream in the transfer direction TD is guided by the guide portions 62*b*, 62*b*, 62*b*, 62*b* that are engaged with the guide rails GR, GR, GR, GR. The configuration allows the pair of holding units 6, 6 to smoothly move upstream and downstream in the transfer direction TD.

Figure 7:
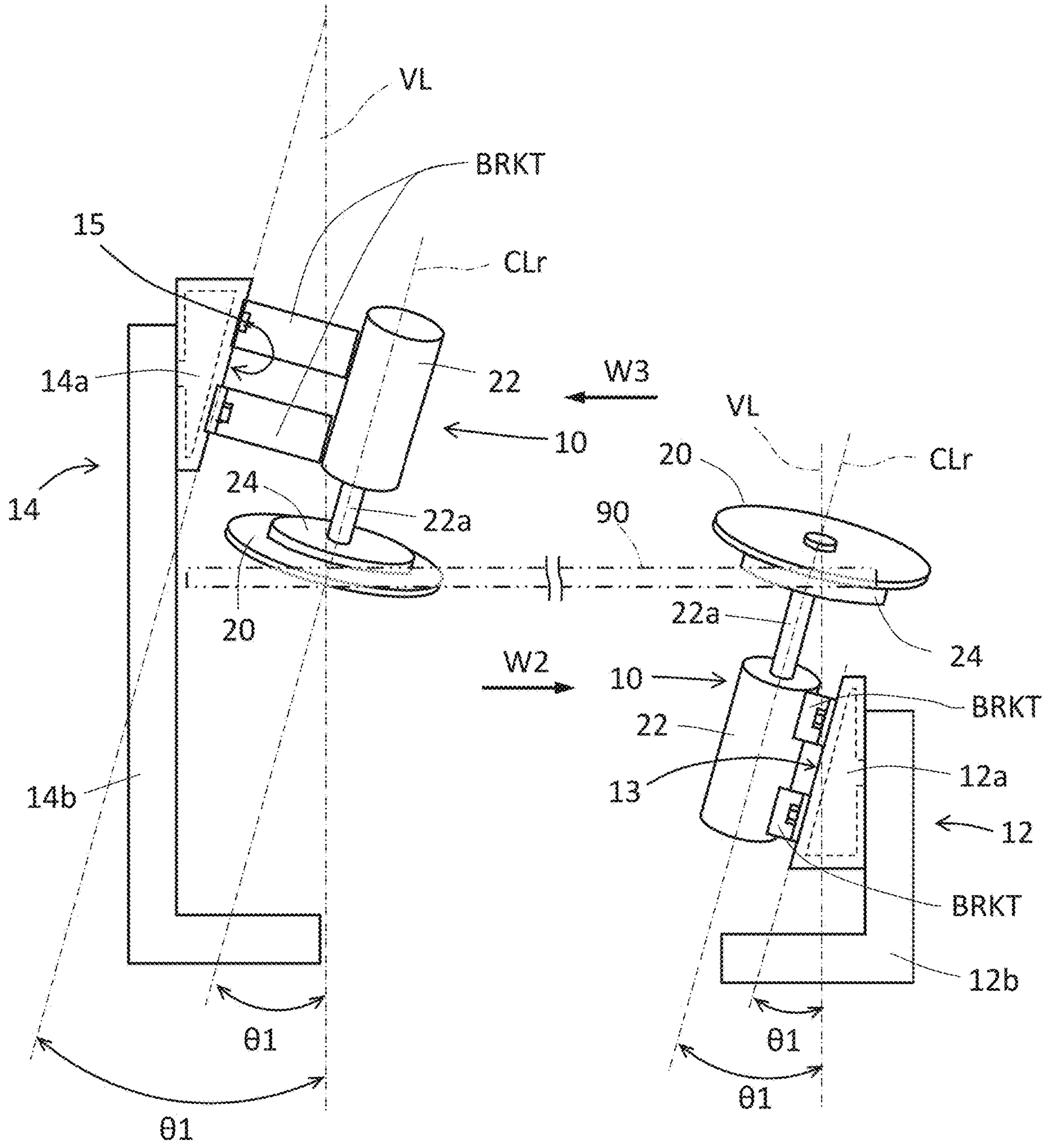
FIG. 7 is a schematic configuration diagram showing a schematic configuration of a pair of machining units 10, 10.
Figure 8:
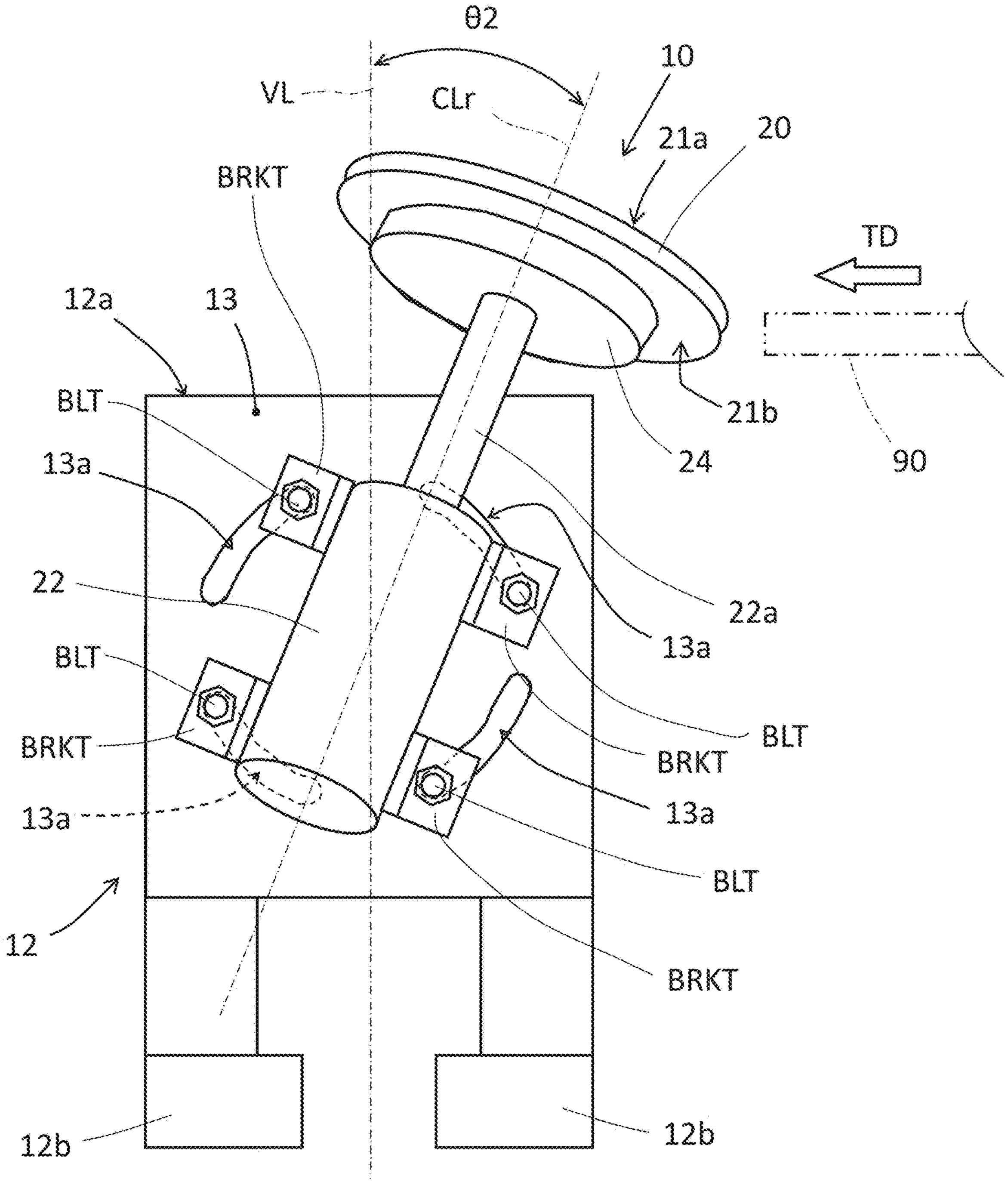
FIG. 8 is a diagram of FIG. 7 viewed in the direction of the arrow W2.
Figure 9:
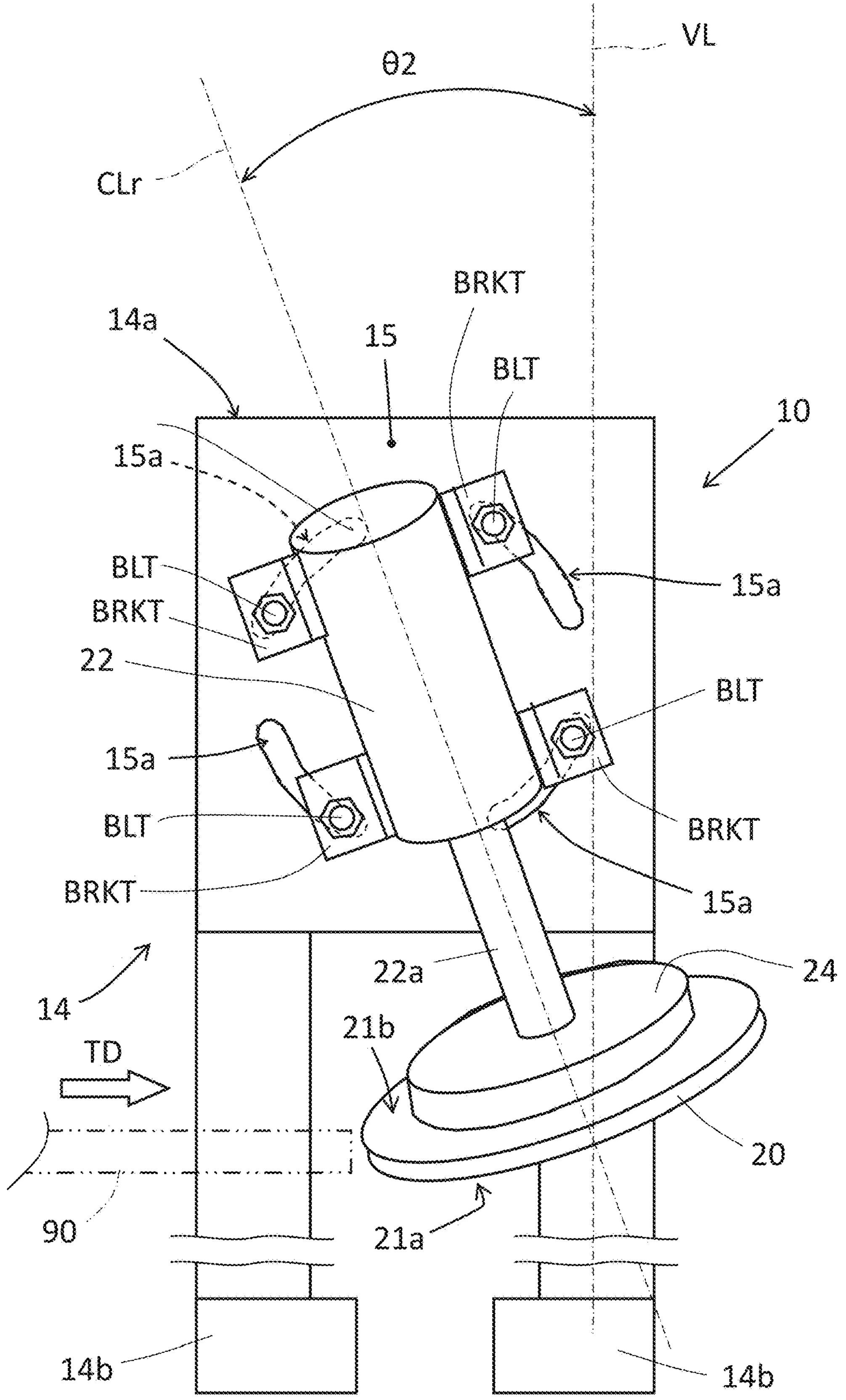
FIG. 9 is a diagram of FIG. 7 viewed in the direction of the arrow W3.

As shown in FIGS. 7 to 9, the machining unit 10 includes a circular saw 20, and a motor 22 having a rotary shaft 22*a* to be connected to the circular saw 20. As shown in FIG. 3, the machining unit 10 is arranged in a positional relationship where a projection of the circular saw 20 intersects projections of both edges 90*a*, 90*b* of the veneer 90 (the projections of both edges 90*a*, 90*b* are included inside the projection of the circular saw 20), when viewed from one side in the longitudinal direction of the frame 4 (one side of the transfer direction TD of the veneer 90), that is, on a virtual projection plane when viewed from one side of the extending direction of the edges 90*a*, 90*b* of the veneer 90 (the direction perpendicular to the plane of FIG. 3). Note that, as shown in FIG. 3, both edges 90*a*, 90*b* of the veneer 90 are free ends.

Figure 10:
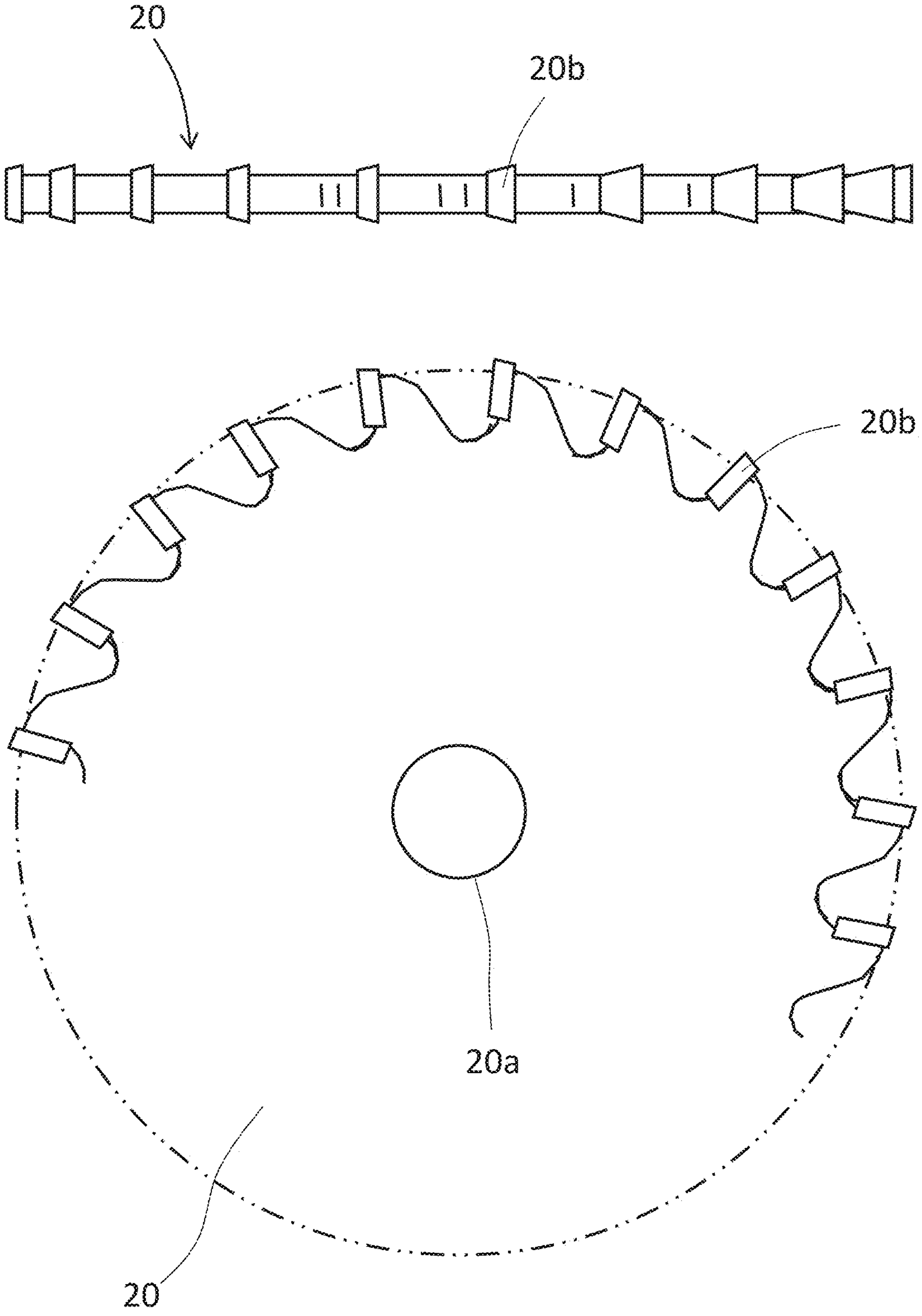
FIG. 10 is an external view showing an external appearance of a circular saw 20.

As shown in FIG. 10, the circular saw 20 has a through-hole 20*a* centrally to accommodate the rotary shaft 22*a* of the motor 22, and a plurality of blades 20*b* on the outer circumference. The blades 20*b* are all configured as flat blades. The circular saw 20 also has a reinforcing disc 24, as shown in FIGS. 7 to 9, on the rear side 21*b*, that is, the side on which motor 22 is mounted. The motor 22 is driven and controlled by the control device. The circular saw 20 corresponds to the "cutter" in the present invention, and the blades 20*b* are an example of implemented configuration for the "blade" in the present invention. Further, the rear surface 21*b* corresponds to the "first surface" in the present invention, and the reinforcing disc 24 is an example of implemented configuration for the "first reinforcing disc" in the present invention.

As shown in FIGS. 7 to 9, the supporting units 12, 14 include tilting tables 12*a*, 14*a* and supporting tables 12*b*, 14*b* for mounting the tilting tables 12*a*, 14*a* to the base 2. The tilting tables 12*a*, 14*a* have slopes 13, 15 tilted by an angle $\theta_1$ with respect to the vertical line VL. Here, the supporting units 12, 14 are mounted to the base 2 in a direction in which the slopes 13 and 15 face each other. At this time, the slopes 13, 15 are parallel to each other, as shown in FIG. 7.

As shown in FIG. 8, the slopes 13, 15 has arc-shaped long holes 13*a*, 13*a*, 13*a*, 13*a*, 15*a*, 15*a*, 15*a* where bolts BLT can be inserted. The machining unit 10 is fixed to the slopes 13, 15 via a bracket BRKT by the bolts BLT.

As such, as shown in FIG. 7, the machining unit 10 is supported by the supporting unit 12,1 14 in a state where, on a virtual projection plane when viewed from one side of the transfer direction TD of the veneer 90 (the longitudinal direction of the frame 4, the direction perpendicular to the plane of FIG. 7), a projection of the rotation axis CLr of the circular saw is tilted relative to a projection of the vertical line VL on the virtual projection plane by an angle $\theta_1$ downstream in the transfer direction TD. The configuration leads to machining of the scarf faces 92*a*, 92*b* (see FIG. 1) at both edges 90*a*, 90*b* of the veneer 90 at a tilt angle $\theta_1$ (hereinafter, this may be referred to as "scarf angle $\theta_1$"). Note that, in the present embodiment, the tilting tables 12*a*, 14*a* are prepared with various scarf angles $\theta_1$, for example, a plurality of tilting tables 12*a*, 14*a* having slopes 13 and 15 with different scarf angles $\theta_1$ at intervals of 1 degree is prepared, and thereby suitable tilting tables 12*a*, 14*a* can be chosen to obtain a desired scarf angle $\theta_1$. The scarf angle $\theta_1$ is an example of implemented configuration for the "first tilt angle" in the present invention.

Figure 14:
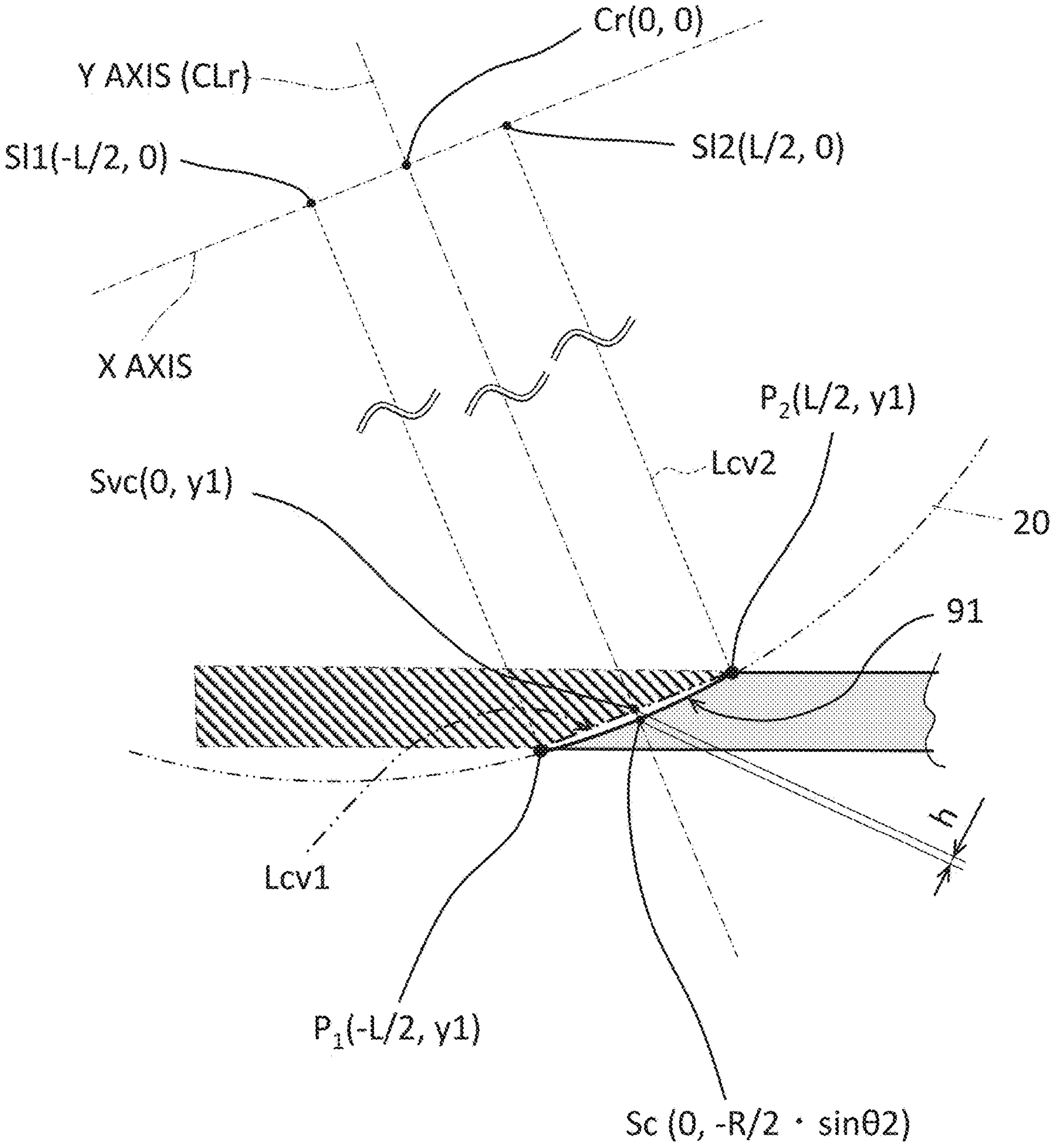
FIG. 14 is an enlarged diagram showing the Z1 part in FIG. 13.

As shown in FIGS. 8 and 9, the machining unit 10 is supported by the support units 12, 14 in a state where, on a virtual projection plane when viewed from one side of the direction (the direction orthogonal to the planes of FIGS. 8 and 9) perpendicular to both the transfer direction TD of the veneer 90 (the longitudinal direction of the frame 4, the left-right direction of FIGS. 8 and 9) and the vertical direction (the up-down direction of FIGS. 8 and 9), a projection of the rotation axis CLr of the circular saw 20 is tilted relative to a projection of the vertical line VL on the virtual projection plane by an angle $\theta_2$ upstream in the transfer direction TD (the right side of FIG. 8 and the left side of FIG. 9). In other words, the circular saw 20 is supported by the supporting units 12, 14 so as to be angled downward relative to the veneer 90 by an angle $\theta_2$ (hereinafter, this may be referred to as "heeling angle $\theta_2$") upward in the transfer direction TD of the veneer 90. Note that the angle $\theta_2$ is adjustable in the range of the extending direction (circumferential direction) of the long holes 13*a*, 13*a*, 13*a*, 13*a*, 15*a*, 15*a*, 15*a*. The configuration leads to the scarf faces 92*a*, 92*b* to be machined at the both edges 90*a*, 90*b* of the veneer 90 to have an arc concavity 91, as shown in FIGS. 11, 12 and 14. The heeling angle $\theta_2$ is an example of implemented configuration for the "second tilt angle" in the present invention.

Figure 16:
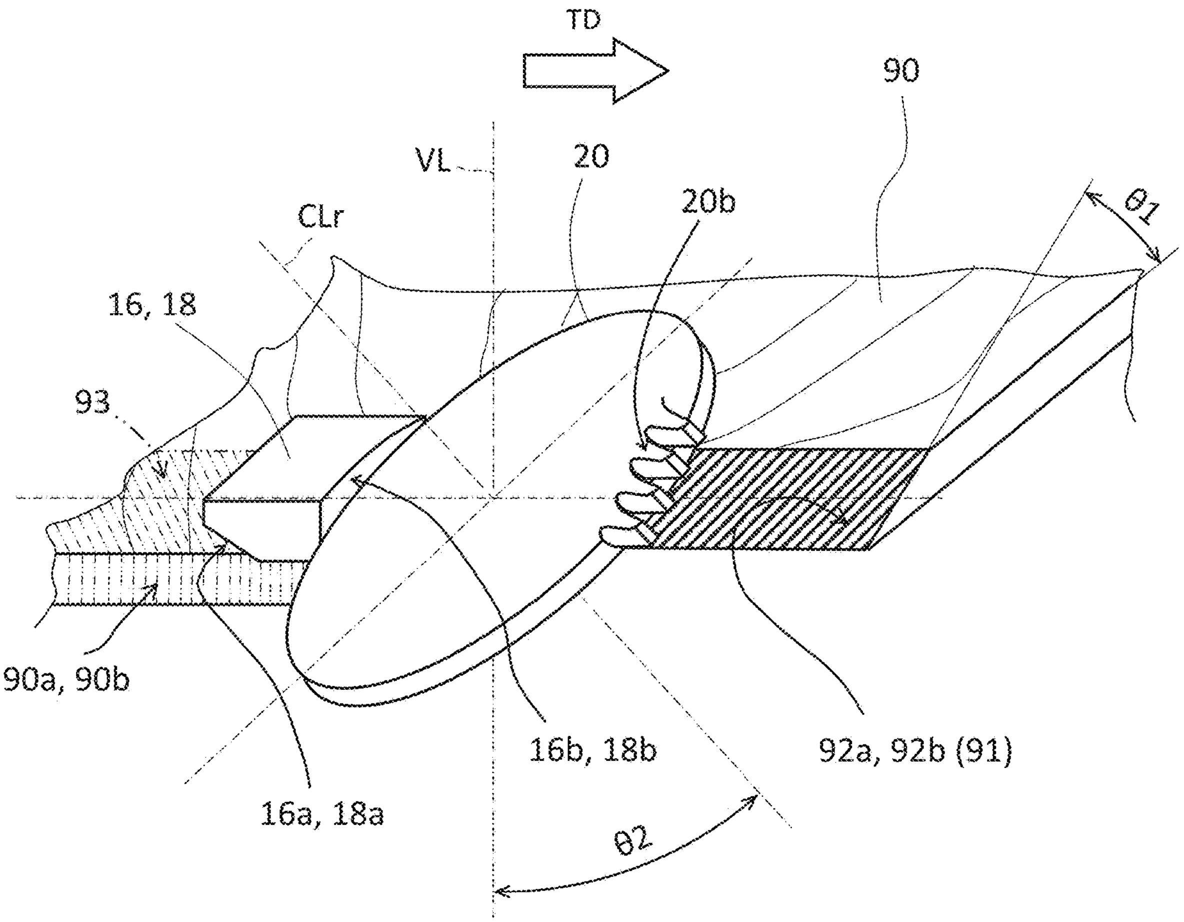
FIG. 16 is an explanatory diagram of machining of the scarf faces 92*a*, 92*b* on the edges 90*a*, of the veneer 90 at a scarf angle $\theta_1$ and a heeling angle $\theta_2$ by the circular saw 20.

As such, since the rotational axis CLr of the circular saw 20 is set at the heeling angle $\theta_2$, double cutting of the veneer 90 by the circular saw 20 (re-contacting of the blades that machined the scarf faces 92*a*, 92*b* with the scarf faces 92*a*, 92*b*) can be well prevented (see FIG. 16). Note that the circular saw 20 is subjected to a bending force due to the contact with the veneer 90 at the heeling angle $\theta_2$, but the reinforcing disc 24 helps the circular saw 20 not to lose the stiffness.

In addition, the circular saw 20 is supported by the supporting units 12, 14 (see FIGS. 7 to 9) so that the rotation axis CLr passes through the center of the arc length of the arc concavity 91, as shown in FIGS. 13, 14, 15, 16, and 19. In order to pass the rotation axis CLr of the circular saw 20 through the center of the arc length of the arc concavity 91, for example, the positions of the tilting tables 12*a*, 14*a* relative to the supporting tables 12*b*, 14*b* in the vertical direction may be changed.

Figure 11A:
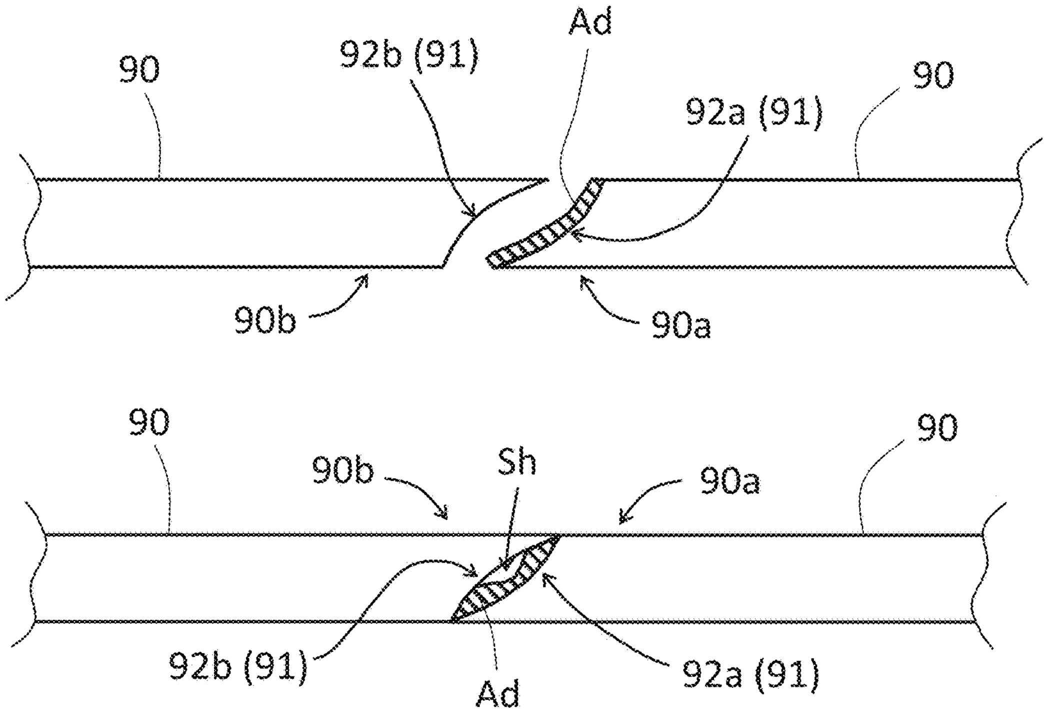
FIG. 11A is an explanatory diagram of joining between scarf faces 92*a*, 92*b* machined by the scarfing machine 1 according to the present embodiment.
Figure 11B:
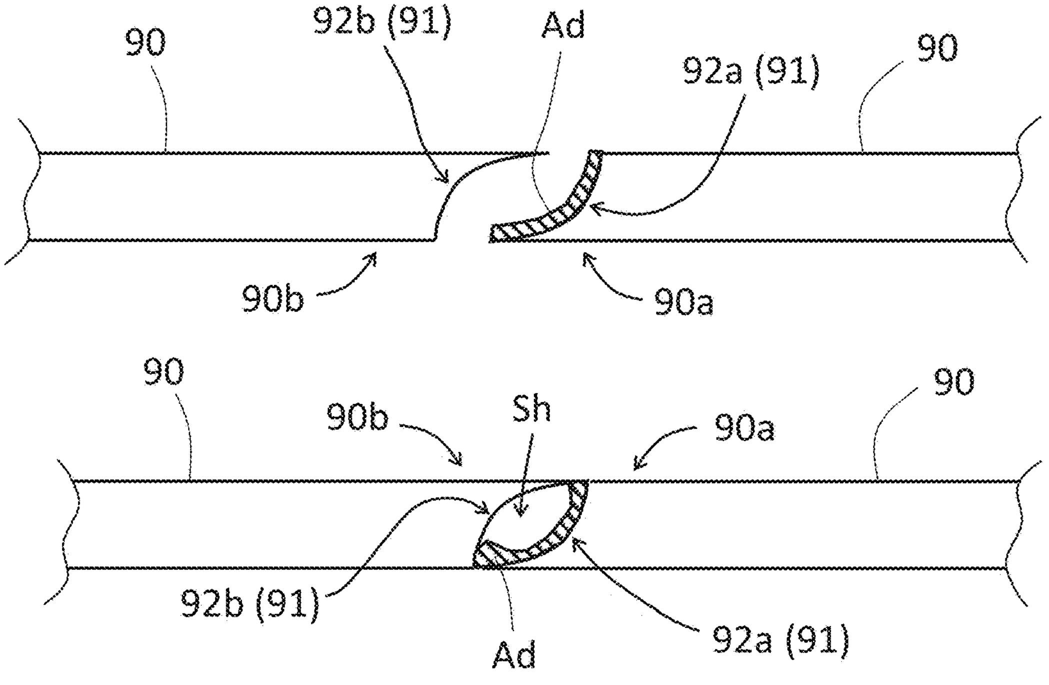
FIG. 11B is an explanatory diagram of joining between scarf faces 92*a*, 92*b* machined by a conventional scarfing machine.
Figure 12:
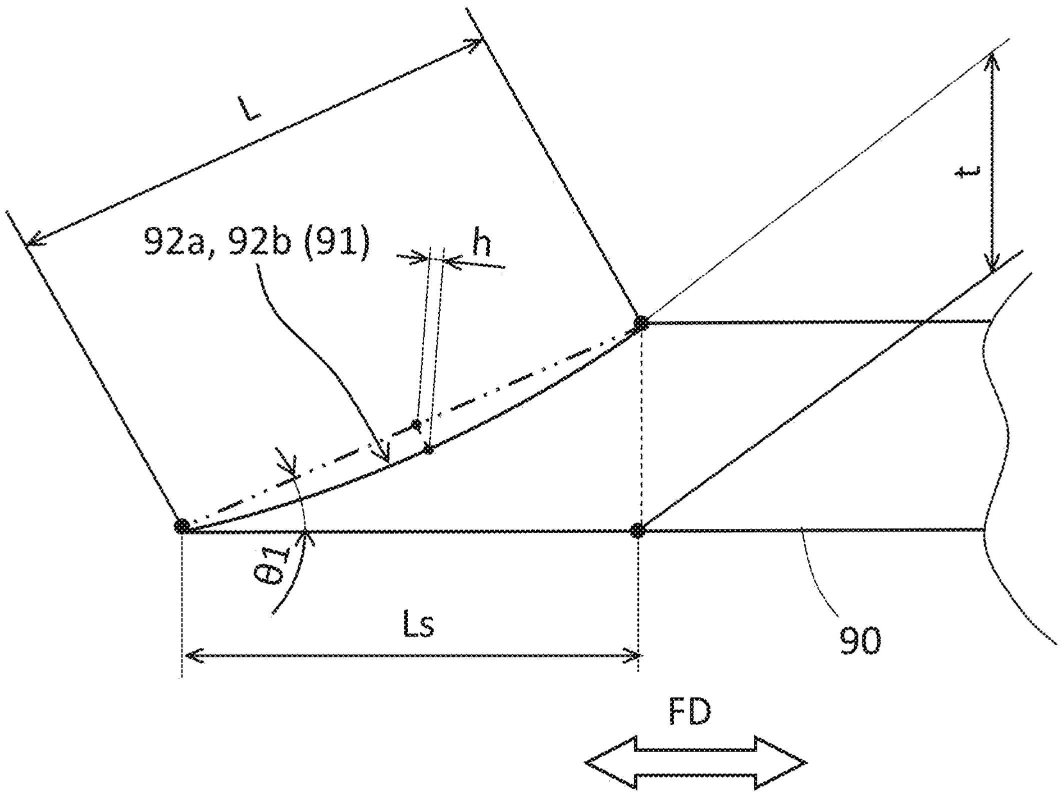
FIG. 12 is an enlarged diagram of the scarf faces 92*a*, 92*b*.

When the circular saw 20 mounted as described above machines the scarf faces 92*a*, 92*b* at the edges 90*a*, 90*b* of the veneer 90, the scarf faces 92*a*, 92*b* have arc concavities 91, 91, as shown in FIGS. 11, 12 and 14. Here, if the arc concavity 91 is appropriate, specifically if the camber h of the arc concavity 91 (see FIG. 12) is appropriate, a space is secured between the arc concavities 91, 91, where the adhesive Ad is well retained (pocket effect). Thus, as shown in FIG. 11A, when the veneers 90 are joined at the scarf faces 92*a*, 92*b* in a post-process, the adhesive Ad is unlikely to seep out onto the surfaces of the veneers 90. In addition, the scarf faces 92*a*, 92*b* are well joined each other, resulting in stable surface machining in post-processes. Furthermore, when the veneers 90 are joined to each other using a hot plate press, a hole Sh for appropriate steam release can be provided, which accelerates curing of the adhesive Ad.

In contrast, if the arc concavity 91 is inappropriate, specifically if the camber h of the arc concavity 91 (see FIG. 12) is inappropriate (e.g., an excessively large camber h), when the veneers 90 are joined at the scarf faces 92*a*, 92*b* in a post-process, as shown in FIG. 11B, the scarf faces 92*a*, 92*b* may be joined only partially, resulting in a poor joining of the veneers 90.

Figure 13:
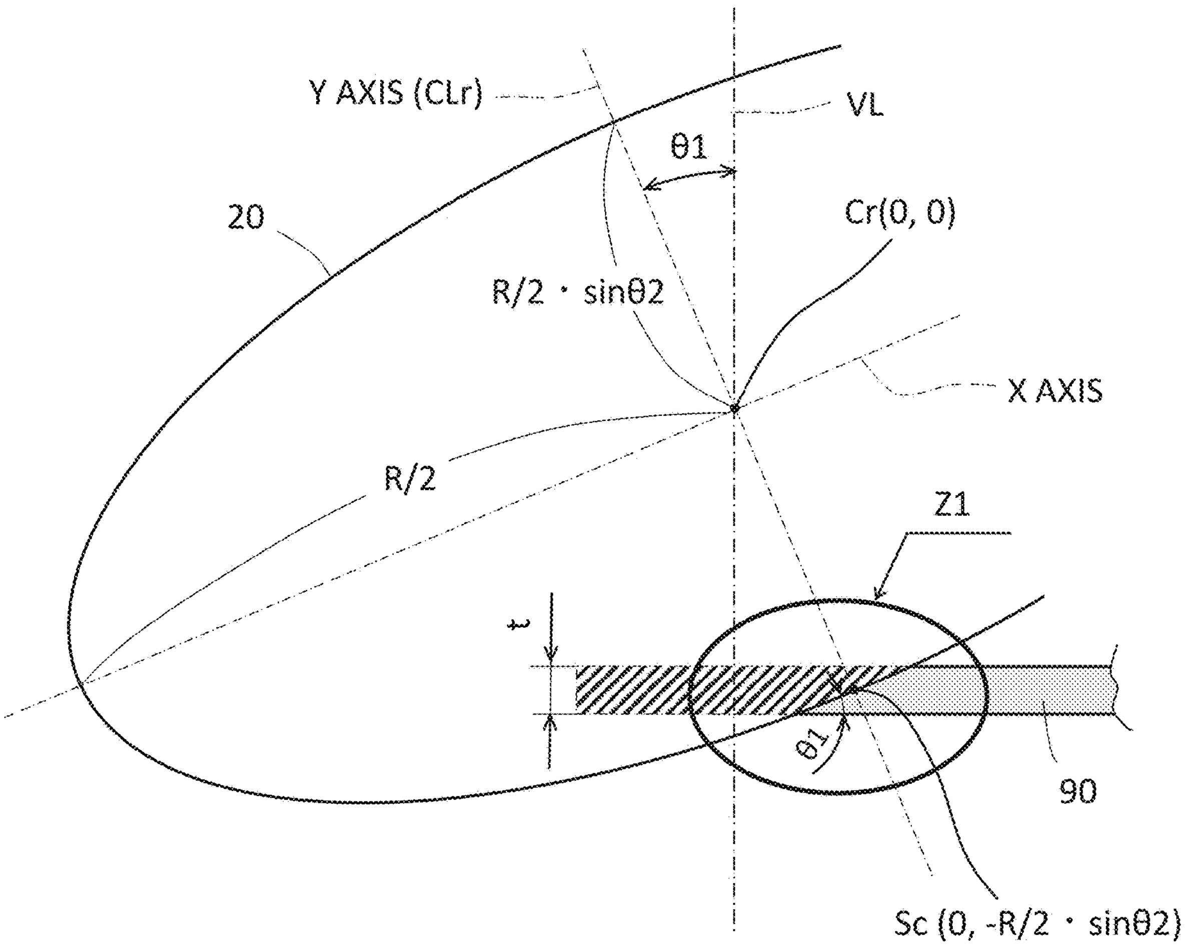
FIG. 13 is an explanatory diagram showing a relative positional relationship between a projection of a circular saw 20, on a virtual projection plane when viewed from one side of a transfer direction TD of a veneer 90, and a projection of the veneer 90 on the virtual projection plane.

In the present embodiment, as shown in FIGS. 13 and 14, the camber h of the arc concavity 91 is calculated based on the relative positional relationship between a projection of a circular saw 20, on a virtual projection plane when viewed from one side of the transfer direction TD of the veneer 90, and a projection of the veneer 90 on the virtual projection plane. Specifically, the camber h of the arc concavity 91 is calculated by the following Equation (8). The way to derive Equation (8) is described below.

[Equation 4]

$$h = \frac{R}{2} \cdot \sin\theta_2 - \sqrt{\sin^2\theta_2 \cdot \frac{R^2 - t^2(1+i^2)}{4}} \tag{8}$$

where R is the diameter of the circular saw 20, t is the thickness of the veneer 90, and i is the scarf ratio.

Figure 15:
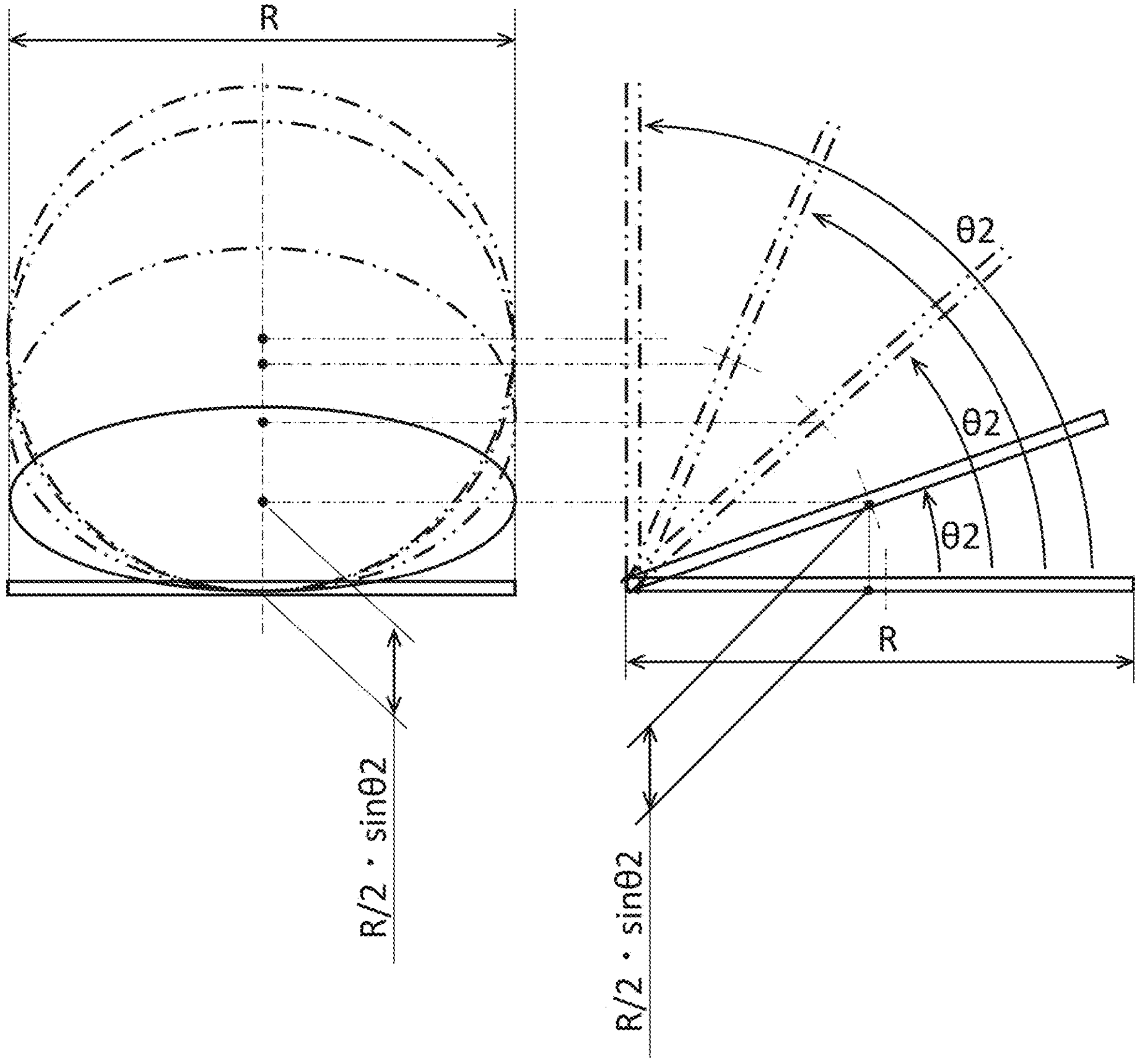
FIG. 15 is an explanatory diagram showing that a projection of the circular saw 20 is an ellipse on a virtual projection plane when viewed from one side of the transfer direction TD of the veneer 90.

As shown in FIGS. 13 and 15, the circular saw 20 is projected as an ellipse with a major axis R and a minor axis R sin $\theta_2$, on a virtual projection plane when viewed from one side of the transfer direction TD of the veneer 90 (the direction of the plane of FIG. 13). Note that the rotation axis CLr of the circular saw 20 on the virtual projection plane overlaps with the Y axis (the major axis of the ellipse).

Here, as shown in FIG. 14, in an XY coordinate system with the origin (0, 0) at the center Cr of the ellipse, the straight line including the minor axis of the ellipse as Y axis, and the straight line including the major axis of the ellipse as X axis, the camber h of the arc concavity 91 is obtained by subtracting the absolute value $|y_1|$ of the Y coordinate at the intersection point Svc between the line segment Lcv1 and the Y axis from the absolute value $|-R/2 \cdot \sin\theta_2|$ of the Y coordinate at the intersection point Sc between the ellipse and the Y axis, wherein the line segment Lcv1 connects between both ends (the points $P_1$ and $P_2$) of a projection of the arc concavity 91 in the XY coordinate system.

As shown in FIG. 14, the Y coordinate at the intersection point Sc is equal to ½ of the minor axis of the ellipse, that is, $-R/2 \cdot \sin \cdot \theta_2$. The Y coordinate y1 at the intersection point Svc can be obtained by the following Equations (9) to (12), which results in the following Equation (13), where Equation (9) represents the ellipse. Equation (10) represents a line segment Lcv2 parallel to the Y axis and passing through one end $P_2$ of the projection of the arc concavity 91 on the virtual projection plane, and can be obtained by the following Equations (11) and (12).

[Equation 5]

$$x^2 + \frac{1}{\sin^2\theta_2} \cdot y^2 = \frac{R^2}{4} \tag{9}$$

-continued $$x = \frac{\sqrt{t^2(i^2+1)}}{2} \tag{10}$$

$$x = \frac{L}{2} \tag{11}$$

$$L = \sqrt{t^2(i^2+1)} \tag{12}$$

$$y_1 = -\sqrt{\left(\sin^2\theta_2 \cdot \frac{R^2 - t^2(1+i^2)}{4}\right)} \tag{13}$$

where L is the scarf length of the scarf faces 92*a*, 92*b* as shown in FIG. 12, more specifically the length of the line segment Lcv1 (see FIG. 14). In addition, i is the scarf ratio of the scarf faces 92*a*, 92*b*. That is, the ratio (I=Ls/t) of a projected length Ls and the thickness t, the projected length Ls being along the fiber direction FD in the projection of the scarf faces 92*a*, 92*b* on a virtual projection plane when viewed from one side of the thickness t of the veneer 90. The projected length Ls is the square root of (Ls=√(L2−t2)) which is obtained by subtracting the square of the thickness t from the square of the scarf length L.

By subtracting the absolute value $|y_1|$ of the Y coordinate at the intersection point Svc from the absolute value $|-R/2 \cdot \sin\theta_2|$ of the Y coordinate at the intersection point Sc, Equation (8) is derived. Here, the diameter R of the circular saw 20 is a value determined by equipment requirements, and the thickness t, the scarf ratio i, and the scarf length L of the veneer 90 are values determined by product requirements. Accordingly, it is obvious that the heeling angle $\theta_2$ should be adjusted in order to set the camber h of the arc concavity 91 to a desired value. As described above, the present embodiment is configured in which the heeling angle $\theta_2$ is adjusted to obtain a desired camber h.

As shown in FIG. 16, the pressing units 16, 18 are arranged, with respect to the circular saw 20, upstream (the left side in FIG. 16) in the transfer direction TD of the veneer and in the vicinity of the outer circumference of the circular saw 20. The pressing units 16, 18 have a size capable of pressing at least portions of the edges 90*a*, 90*b* of the veneer 90, the portions resulting in chips 93 when cut out (excluded) along with machining of the scarf faces 92*a*, 92*b*. In addition, the pressing units 16, 18 have slopes 16*a*, 18*a* on parts of the bottom surfaces, and curved surfaces 16*b*, 16*b* of substantially the same curvature as that of the circular saw 20, the curved surfaces 16*b*, 16*b* facing the outer periphery of the circular saw 20. The slopes 16*a*, 18*a* are tilted upward in a direction away from the curved surfaces 16*b*, 18*b*. In other words, the slopes 16*a*, 18*a* have an upwardly inclining surface toward the upstream of the transfer direction TD of the veneer 90 (the left side in FIG. 16).

In the present embodiment, as shown in FIG. 16, the pressing units 16, 18 press, just before machining, the part of the veneer 90 to be machined as the scarf faces 92*a*, 92*b* by the circular saw 20. Thus, deformations such as warp and waviness of the veneer 90 just before machining be well decreased. As a result, the scarf faces 92*a*, 92*b* can be satisfactorily machined. Since the pressing units 16, 18 have the slopes 16*a* and 18*a*, the conveyed veneer can be smoothly received below the pressing units 16, 18. In addition, since the pressing units 16, 18 have curved surfaces 16*b* and 18*b*, the veneer 90 can be pressed until just before reaching the circular saw 20, which well decreases deformations such as warp and waviness of the veneer 90 just before machining Next, the operation of the scarfing machine 1 of the above configuration, in particular, the operation of machining the scarf faces 92*a*, 92*b* on both edges 90*a*, 90*b* of the veneer 90 will be described. When the scarfing machine 1 is started to operate, as shown in FIG. 1, the pair of holding units 6, 6 is arranged upstream in the transfer direction TD of the veneer 90 (one end side in the longitudinal direction of the frame 4).

When the scarfing machine 1 is started, first, the control device drive-controls the carry-in conveyor 70 and the carry-in roller 70*a*, and one veneer 90 is picked up from a plurality of veneers 90 stacked on the carry-in conveyor 70, and carried into the scarfing machine 1 via the carry-in roller 70*a*. Here, the veneer 90 is arranged on the carry-in conveyor so that the fiber direction FD is along the carry-in direction (substantially parallel to the carry-in direction), and thus the veneer 90 is carried into the scarfing machine 1 in a posture where the fiber direction FD is almost perpendicular to the longitudinal direction of the frame 4 (the transfer direction TD of the veneer 90).

Figure 17:
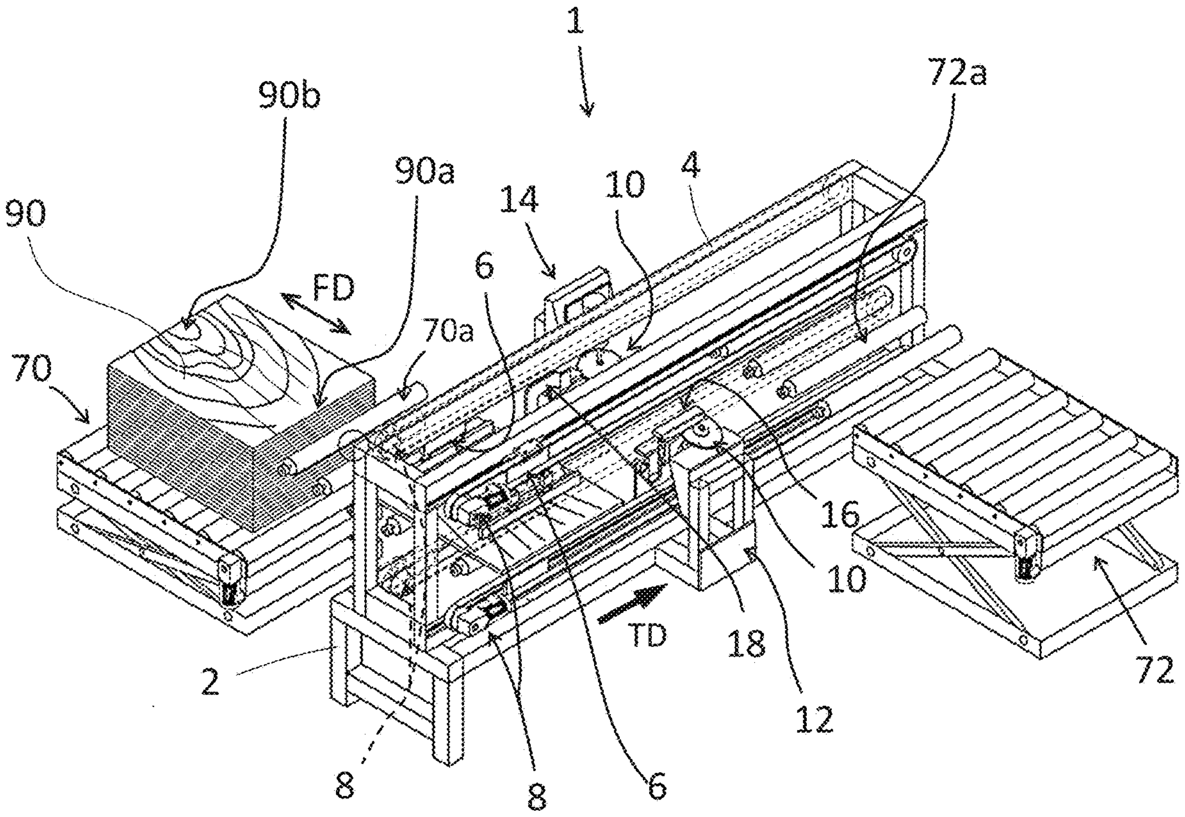
FIG. 17 is an explanatory diagram of the veneer 90 carried into the scarfing machine 1 by a carry-in roller 70*a* and held by a pair of clamping bars 60, 60.

When the veneer 90 is carried into the scarfing machine 1 via the carry-in roller 70*a*, the control device drives each pair of air cylinders 62*a*, 62*a* (see FIG. 2) of the pair of holding units 6, 6. The veneer 90 is thereby clamped by each pair of clamping bars 60, 60 (see FIGS. 2 and 17). In this state, the control device drive-controls the motors M, M, M, M of the driving unit 8 (see FIGS. 5 and 6), so that the endless belts BELT, BELT, BELT, BELT (see FIGS. 5 and 6) rotate clockwise when viewed in the direction of the arrow Ar in FIG. 6. As a result, the pair of holding units 6, 6 move toward downstream in the transfer direction TD while holding the veneer 90 therebetween.

At this point of time, the motors 22, 22 (see FIG. 7) of the pair of machining units 10 are driven by the control device, and the veneer 90 passes through the position where the pair of machining units 10, 10 are arranged. During the passing, the scarf faces 92*a*, 92*b* are machined on both edges 90*a*, 90*b* of the veneer 90 by a pair of circular saws 20, 20. Note that the scarf faces 92*a*, 92*b* are machined so as to be substantially parallel to each other.

In the present embodiment, the circular saws 20, 20 are supported by the supporting units 12, 14 at a heeling angle $\theta_2$. That is, the circular saw 20 is angled downward by an angle $\theta_2$ toward the upstream of the transfer direction TD with respect to the veneer 90. Thereby, double cutting of the veneer 90 by the circular saw 20 (re-contacting of the blades 20*b* that machined the scarf faces 92*a*, 92*b* with the scarf faces 92*a*, 92*b*) can be well prevented (see FIG. 16).

Figure 18:
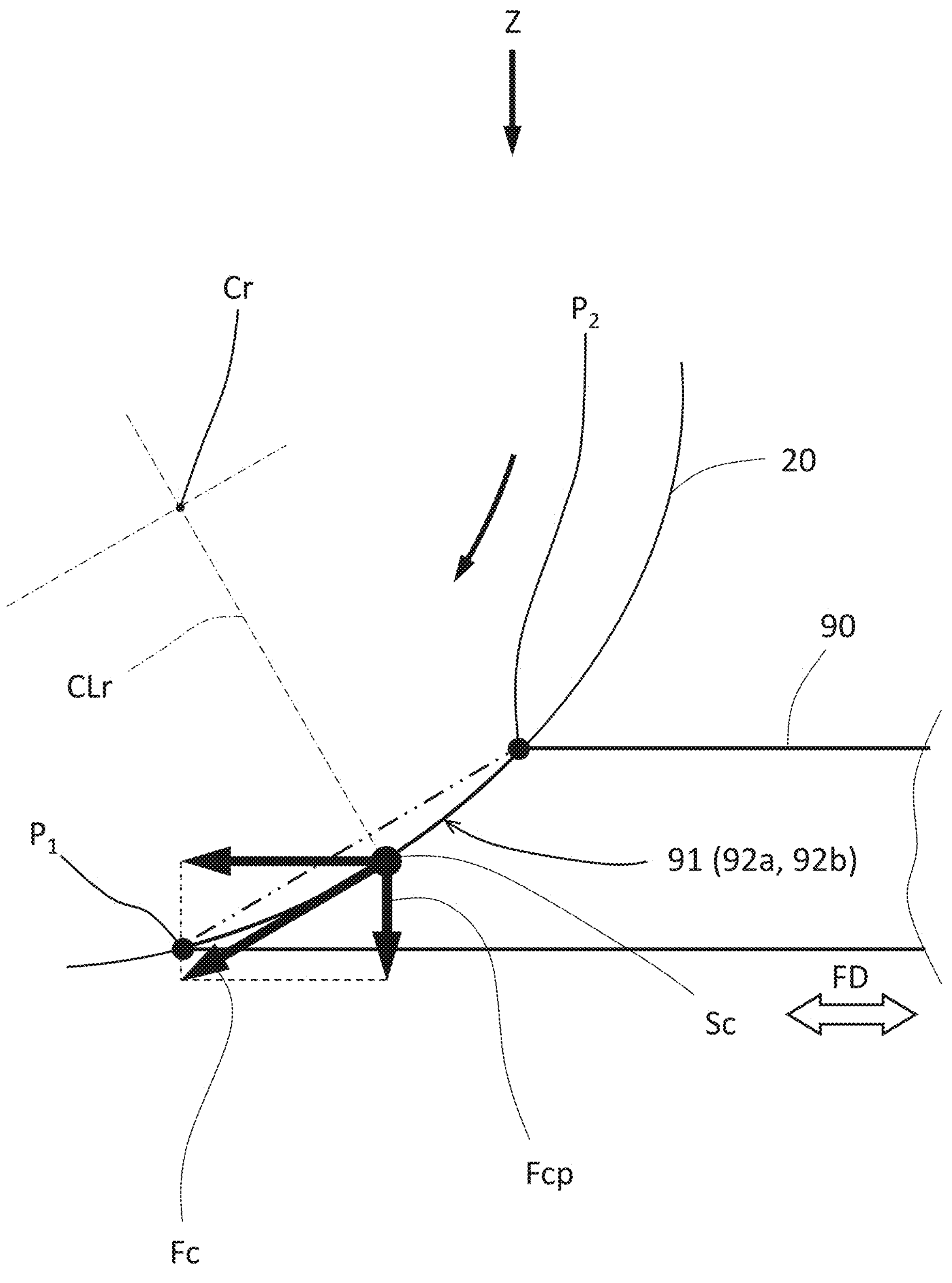
FIG. 18 is an explanatory diagram of a cutting force Fc acting on the scarf faces 92*a*, 92*b*.

In addition, since a force component Fcp of the cutting force Fc of the circular saw acts in the direction to press the veneer 90 into the thickness direction, as shown in FIG. 18. Hence, deformation of the veneer 90 such as warp and waviness can be decreased satisfactorily. The rotation axis CLr of the circular saw 20 passes through approximately the center (the point Sc) of the arc length of the scarf faces 92*a*, 92*b* (the length of the arc connecting the points $P_1$ and $P_2$) (see FIG. 14). Hence, the force component Fcp acts on approximately the center (the point Sc) of the arc length of the scarf faces 92*a*, 92*b* (the length of the arc connecting the points $P_1$ and $P_2$). Further, all of the plurality of blades 20*b* of the circular saw 20 are flat, and thereby the force components Fcp of the cutting forces Fc from all the blades 20*b* are caused to act in the direction to press the veneer 90 into the thickness direction. Thus, deformations such as warp and waviness of the veneer 90 can be further decreased. As a result, the scarf faces 92*a*, 92*b* can be satisfactorily machined.

Figure 19:
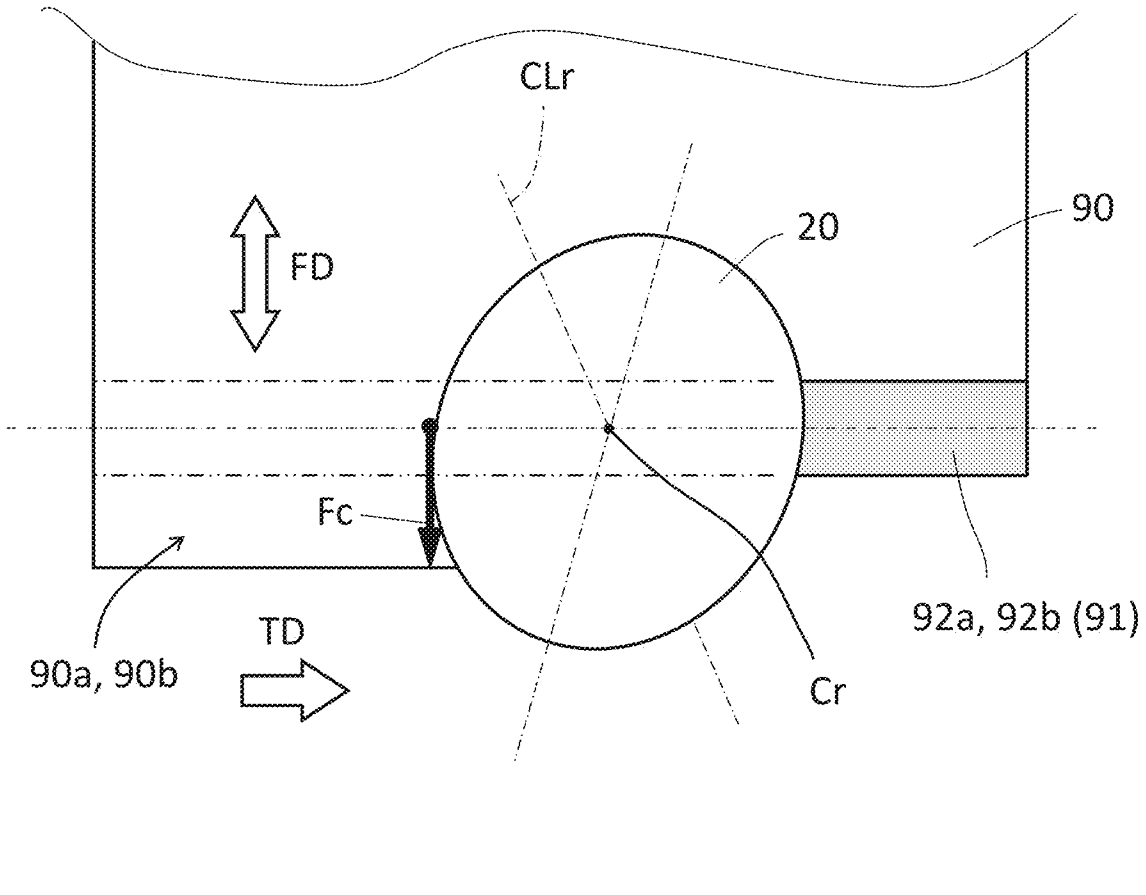
FIG. 19 is an explanatory view of the relative positional relationship between the circular saw and the veneer 90 as seen from above in the vertical direction.

As shown in FIG. 19, the direction in which the cutting force Fc acts (the direction the blades 20*b* pass) and the fiber direction FD of the veneer 90 can be identical to each other approximately at the center (the point Sc) in the lengthwise direction of the slopes of the scarf faces 92*a*, 92*b* (the direction along the length of the arc connecting the points $P_1$ and $P_2$). Thus, in machining of the scarf faces 92*a*, 92*b*, the cutting force Fc is unlikely to act in the direction intersecting the fiber direction FD. As a result, damages to the scarf faces 92*a*, 92*b* in the direction intersecting the fiber direction FD can be sufficiently decreased.

In the present embodiment, the circular saws 20, 20 are arranged at the heeling angle $\theta_2$, and the resulting scarf faces 92*a*, 92*b* have arc concavities 91, 91. The shape of said arc concavities 91, 91, specifically the magnitude of cambers h, h of said arc concavities 91, 91 greatly affects the quality of joining between the scarf faces 92*a*, 92*b* of the veneers 90. In the present embodiment, Equation (8) is used to adjust the heeling angle $\theta_2$ so as to obtain the desired camber h, h. Accordingly, while avoiding partial joining between the scarf faces 92*a*, 92*b*, a space for well retaining the adhesive Ad can be secured between the arc concavities 91, 91 (pocket effect). As a result, when the veneers 90 are joined together at the scarf faces 92*a*, 92*b*, the adhesive Ad can be well hindered from seeping out onto the surfaces of the veneers 90 (FIG. 11A), and the scarf faces 92*a*, 92*b* can be properly joined together. Note that, when the veneers 90 are joined each other using a hot plate press, a hole Sh for appropriate steam release can be provided, which accelerates curing of the adhesive Ad.

Figure 20:
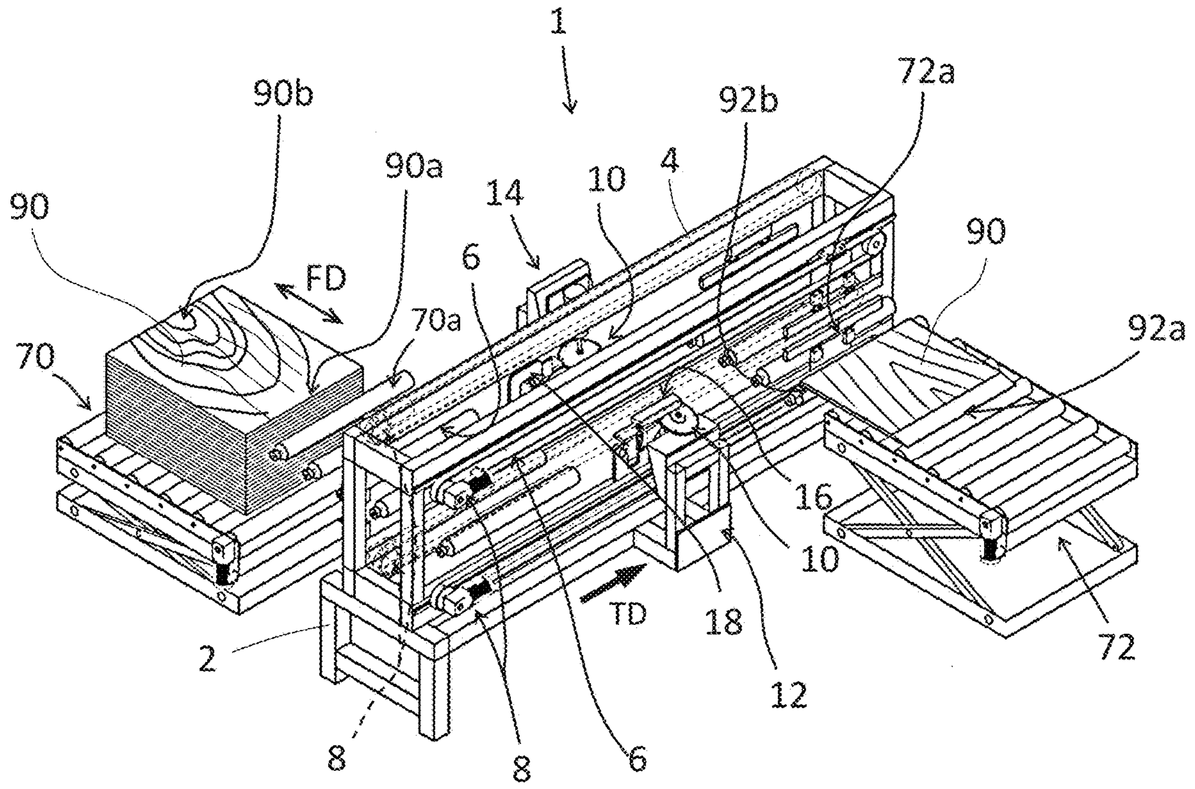
FIG. 20 is an explanatory diagram of the veneer 90 carried out of the scarfing machine 1 by the carry-out roller 72*a*.

As described above, the veneer 90 with the scarf faces 92*a*, 92*b* machined by the pair of machining units 10, 10 is transported to reach the carry-out conveyor 72 arranged on the other longitudinal end side of the frame 4 (downstream of the transfer direction TD). The veneer 90 is then carried out from the scarfing machine 1 by the carry-out roller 72*a* and the carry-out conveyor 72, which are driven and controlled by the control device, to be carried to a post-process (see FIG. 20).

According to the scarfing machine 1 of the embodiment of the present invention described above, a heeling angle $\theta_2$ is adjusted to obtain a desired camber h, h, so as to machine the scarf faces 92*a*, 92*b* on the veneer 90 at the heeling angle $\theta_2$. Thus, double cutting of the veneer 90 by the circular saw 20 (re-contacting of the blades 20*b* that machined the scarf faces 92*a*, 92*b* with the scarf faces 92*a*, 92*b*) can be well prevented. Since the cambers h, h of the arc concavities 91, 91 can be set to a desired value, the scarf faces 92*a*, 92*b* are unlikely to bond only partially to each other, as well as a space for well retaining the adhesive Ad can be secured between the arc concavities 91, 91 (pocket effect). As a result, when the veneers 90 are joined together at the scarf faces 92*a*, 92*b*, the adhesive Ad can be hindered from seeping out onto the surfaces of the veneers 90, and the scarf faces 92*a*, 92*b* can be joined appropriately. Furthermore, when the veneers 90 are joined each other using a hot plate press, a hole Sh for appropriate steam release can be provided, which accelerates curing of the adhesive Ad.

According to the scarfing machine 1 of the embodiment of the present invention, the force component Fcp of the cutting force Fc of the circular saw 20 can be caused to act, in the direction to press the veneer 90 into the thickness direction, approximately at the center (the point Sc) of the arc length (the length of the arc $P_1$ and $P_2$) of the scarf faces 92*a*, 92*b*. As such, deformations such as warp and waviness of the veneer 90 can be well decreased.

All of the plurality of blades 20$b$ of the circular saw 20 are flat, and thereby the force components Fcp of the cutting forces Fc from all the blades 20$b$ can be caused to act in the direction to press the veneer 90 into the thickness direction. In addition, the direction in which the cutting force Fc acts (the direction the blades 20$b$ pass) and the fiber direction FD of the veneer 90 can be identical to each other approximately at the center (the point Sc) in the lengthwise direction of the slopes of the scarf faces 92$a$, 92$b$ (the direction along the points $P_1$ and $P_2$). As a result, damages to the scarf faces 92$a$, 92$b$ in the direction intersecting the fiber direction FD can be well decreased.

Figure 21:
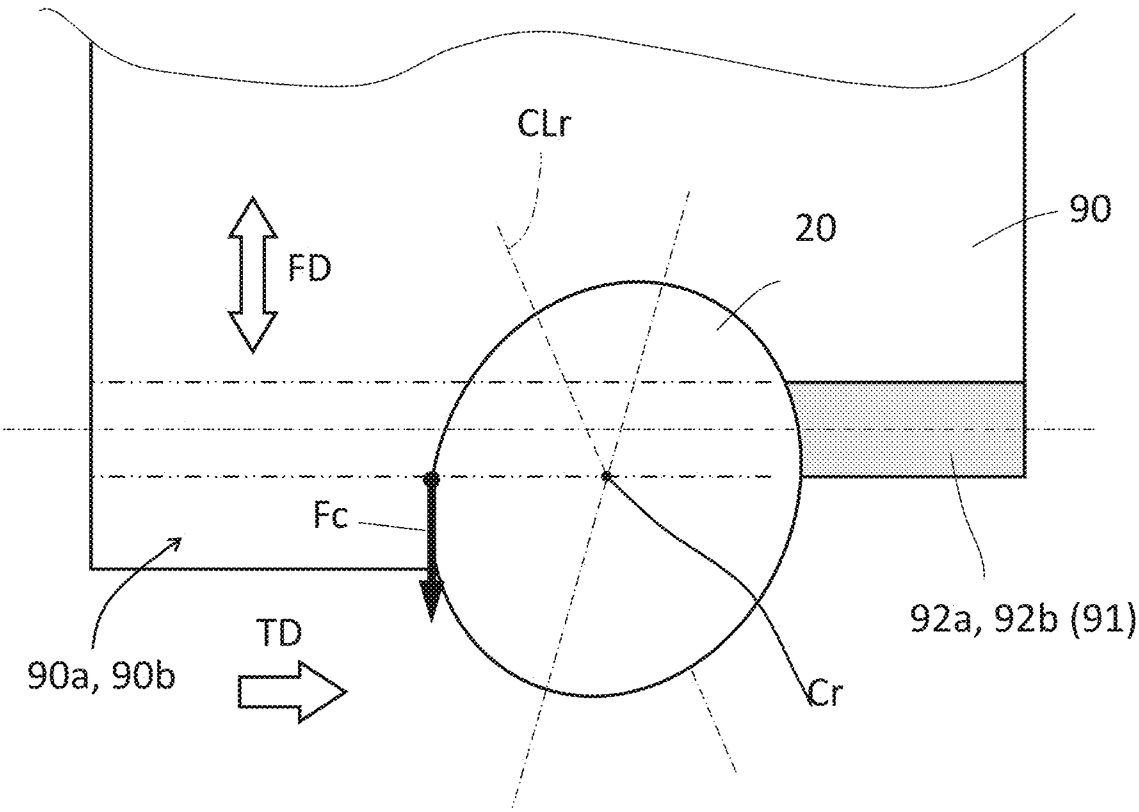
FIG. 21 is an explanatory diagram of a modification in which the relative positional relationship between a circular saw 20 and a veneer 90 is set so that the rotation axis CLr of the circular saw 20 passes through the tips of the scarf faces 92*a*, 92*b*.
Figure 22:
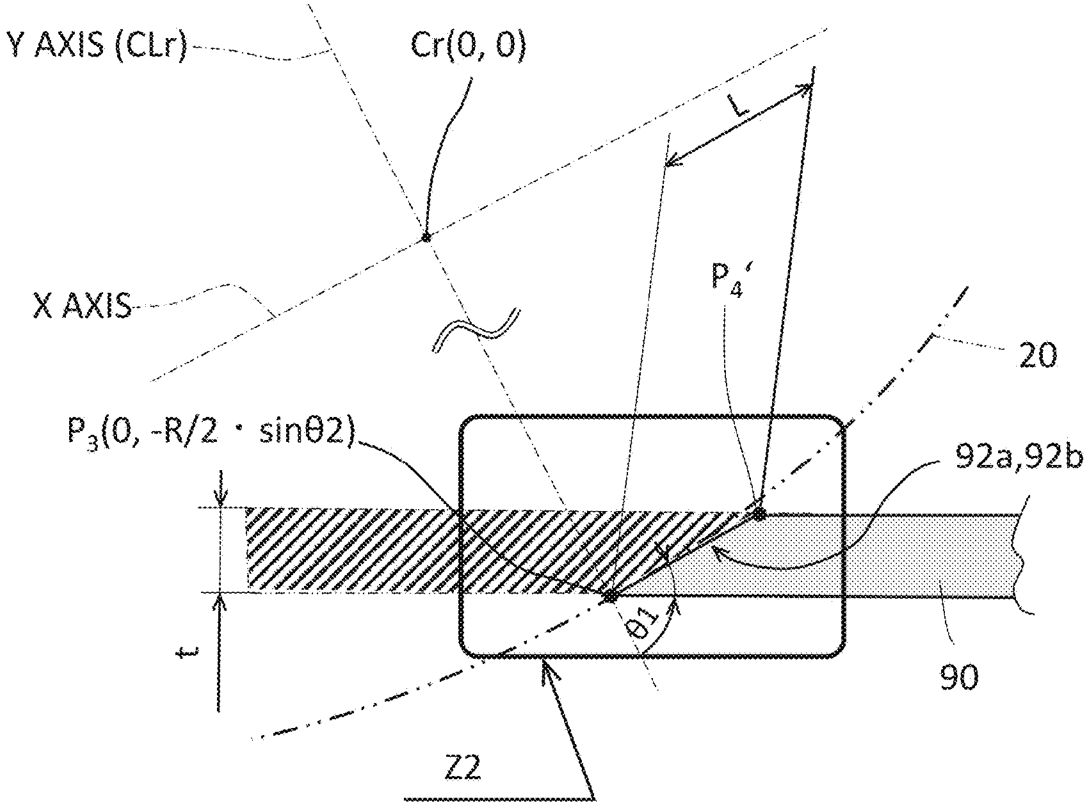
FIG. 22 is an explanatory diagram of, in a modification, the relative positional relationship between a projection of a circular saw 20, on a virtual projection plane when viewed from one side of a transfer direction TD of the veneer 90, and a projection of the veneer 90 on the virtual projection plane.

In the present embodiment, the rotation axis CLr of the circular saw 20 passes through approximately the center (the point Sc) of the arc length of the scarf faces 92$a$, 92$b$ (the length of the arc connecting the points $P_1$ and $P_2$), but the present invention is not limited to this configuration. For example, as shown in FIGS. 21 and 22, the rotation axis CLr of the circular saw 20 may pass through the tips of the scarf faces 92$a$, 92$b$ (the tips being one ends of the scarf faces 92$a$, 92$b$ in the direction along the fiber direction FD on a virtual projection plane when the veneer 90 is viewed in the thickness direction (the point $P_3$ in FIG. 22)).

Figure 23:
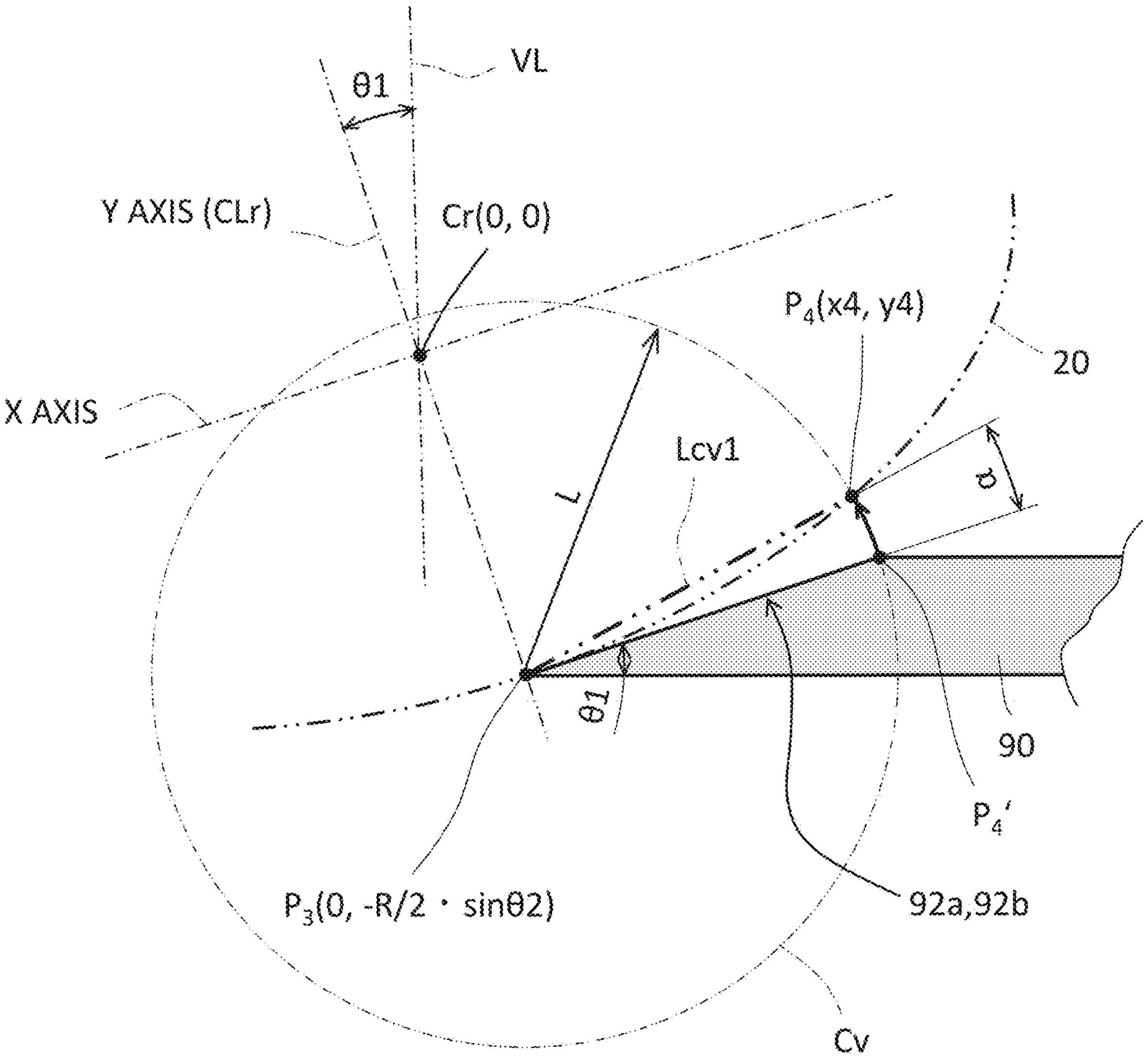
FIG. 23 is an enlarged diagram showing the Z2 section in FIG. 22.

In this case, as in the above-described embodiment, a camber $h_1$ can be determined using an XY coordinate system with the origin (0, 0) at the center Cr of an ellipse, the straight line including the minor axis of the ellipse as Y axis, and the straight line including the major axis of the ellipse as X axis. In a case where the rotation axis CLr of the circular saw 20 passes through the tips of the scarf faces 92$a$, 92$b$ (the point $P_1$ in FIG. 22), in order to obtain a desired scarf length L (the length of the line segment Lcv1), as shown in FIG. 23, the rotation axis CLr of the circular saw 20 is required to be tilted by an angle smaller than the scarf angle $\theta_1$ by an angle $\alpha$. In other words, in order to obtain the desired scarf length L (the length of the line segment Lcv1), the circular saw 20 is set such that, on a virtual projection plane when viewed from one side in the transfer direction TD of the veneer 90 (the direction orthogonal to the plane of FIG. 23), a projection of the rotational axis center line CLr of the circular saw is tilted by an angle ($\theta_1-\alpha$) to the left (the left side in FIG. 23) toward downstream of the transfer direction TD (the rear side of the paper of FIG. 23) with respect to the vertical line VL on the virtual projection plane.

Figure 24:
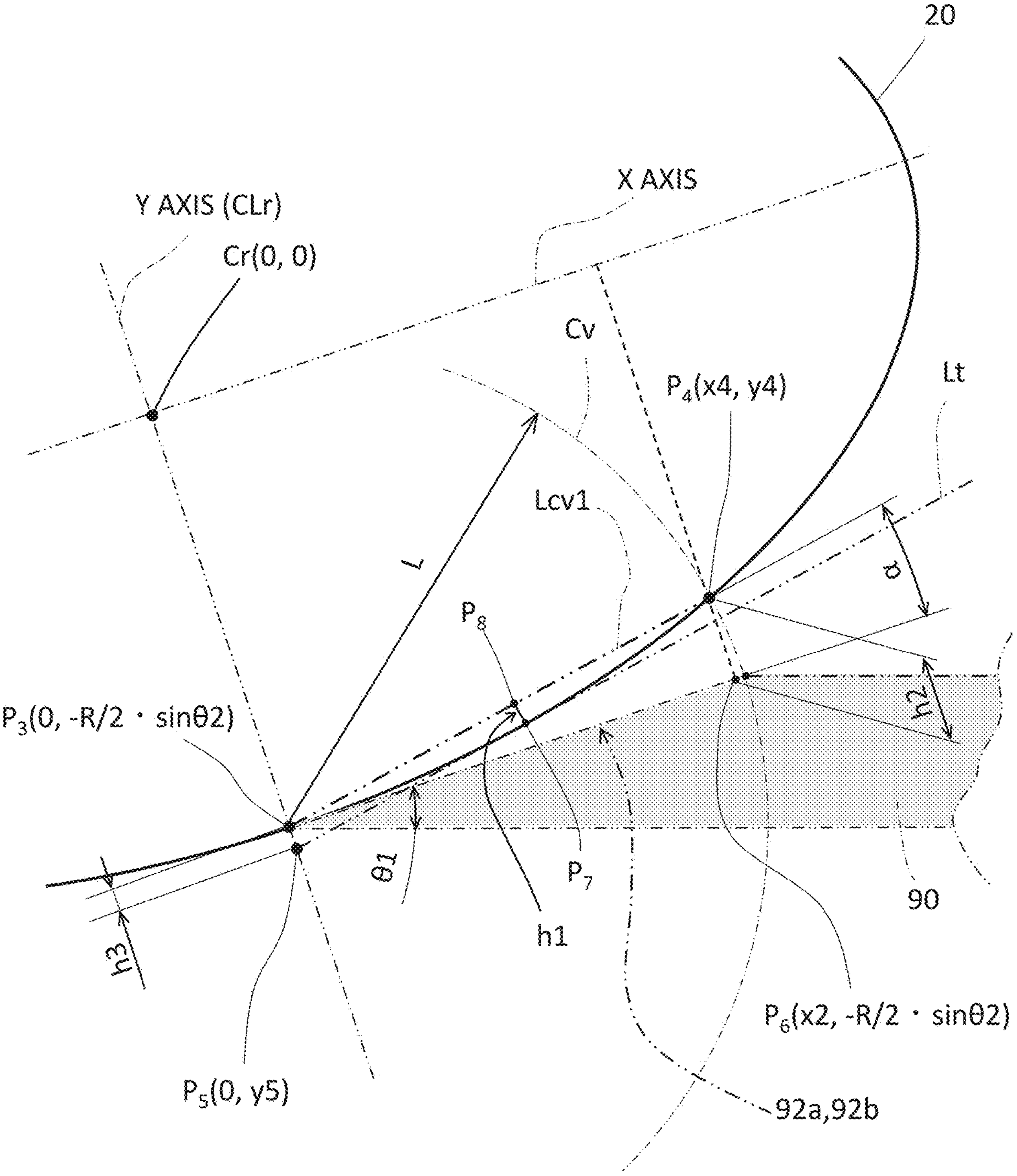
FIG. 24 is an explanatory diagram for obtaining an angle $\alpha$.
Figure 25:
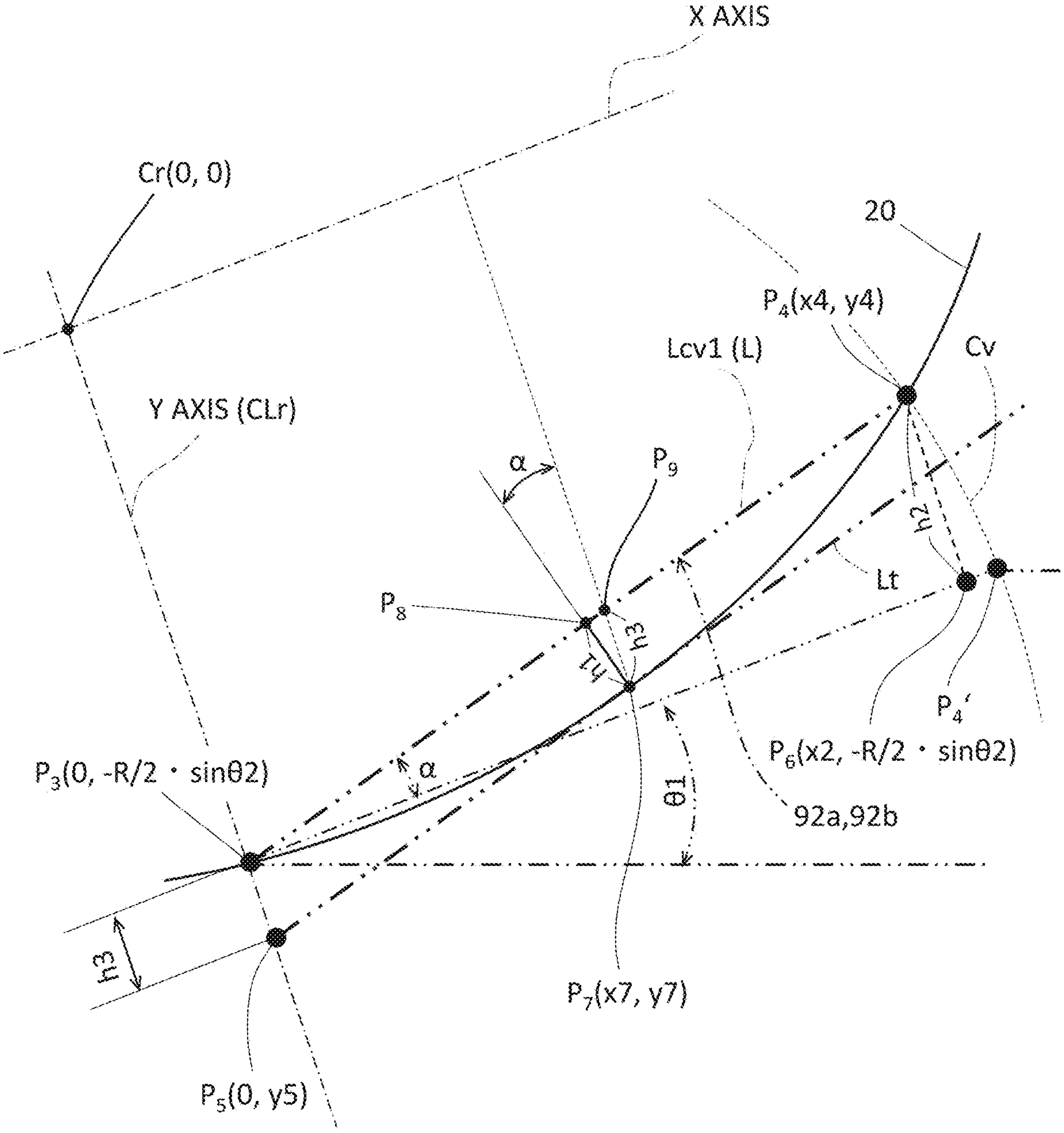
FIG. 25 is an explanatory diagram for obtaining a camber $h_1$.

The camber $h_1$ can be determined by the following Equations (14) to (23). Specifically, the camber $h_1$ of the arc concavity 91 is calculated by the angle $\alpha$ and a distance $h_3$. Here, the angle $\alpha$ is determined by the following Equations (15) to (18) and the above-described Equation (12). The distance $h_3$ is determined by the following Equations (19) to (23), the distance $h_3$ being parallel to the line segment Lcv1 (the straight line connecting the both ends (the points $P_3$ and $P_4$) of a projection of the arc concavity 91 in the XY coordinate system) and connecting between a Y intercept $P_5$ of the straight line Lt that is tangent to the ellipse (the circular saw 20) and the intersection point $P_3$ of the ellipse and the Y axis. The distance $h_3$ is, in other words, the length $h_3$ of a hypotenuse $P_7P_9$ of a triangle $P_7P_8P_9$ (see FIGS. 24 and 25). Thereby, the camber $h_1$ can be calculated by substituting the obtained angle $\alpha$ and the distance $h_3$ into Equation (14).

[Equation 6]

$$h_1 = h_3 \cdot \cos\alpha \tag{14}$$

-continued $$\alpha = \sin^{-1}\left(\frac{h_2 - y_4}{L}\right) \tag{15}$$

$$h_2 = \frac{R}{2} \cdot \sin\theta_2 - y_4 \tag{16}$$

$$x^2 + (y + b)^2 = L^2 \tag{17}$$

$$y_4 = \frac{-R\sin\theta_2 + \sqrt{R^2\sin^2\theta_2 - 4\left(1 - \frac{1}{\sin^2\theta_2}\right)\left(\frac{R^2}{4}\sin^2\theta_2 + \frac{R^2}{4} - L^2\right)}}{2\left(1 - \frac{1}{\sin^2\theta_2}\right)} \tag{18}$$

$$y = \tan\alpha \cdot x + y_5 \tag{19}$$

$$x_7 = \frac{-2 \cdot y_5 \cdot \tan\alpha \pm \sqrt{4 \cdot y_5^2 \cdot \tan^2\alpha - 4(\tan^2\alpha + \sin^2\theta_2)\left(y_5^2 - \frac{R^2}{4}\sin^2\theta_2\right)}}{2(\tan^2\alpha + \sin^2\theta_2)} \tag{20}$$

$$4 \cdot y_5^2 \cdot \tan^2\alpha - 4(\tan^2\alpha + \sin^2\theta_2)\left(y_5^2 - \frac{R^2}{4}\sin^2\theta_2\right) = 0 \tag{21}$$

$$y_5 = -\frac{R}{2} \cdot \sqrt{\tan^2\alpha + \sin^2\theta_2} \tag{22}$$

$$h_3 = |y_5| - \left|-\frac{R}{2} \cdot \sin\theta_2\right| \tag{23}$$

Here, Equation (15) is a formula to find the angle $\alpha$ based on an inverse sine in a right triangle P3P4P6 (see FIG. 25), and the angle $\alpha$ can be calculated when h 2 and L are determined. The $h_2$ is a length of the side $P_4P_6$ of the right triangle P3P4P6, and can be determined by Equation (16): subtracting the absolute value $|y_4|$ of Y coordinates at the point $P_4$ from the absolute value $|-R/2 \cdot \sin\theta_2|$ of Y coordinates at the point $P_6$. The y4 is the Y coordinates of the point $P_4$ between a virtual circle Cv of a radius L (see FIGS. 24 and 25) and the ellipse, and can be obtained by Equation (18) from Equation (17) for the virtual circle Cv and Equation (9) for the ellipse. Here, the minor diameter of the ellipse is $R/2 \cdot \sin\theta_2$, the Y coordinates of the point $P_3$ is $-R/2 \cdot \sin\theta_2$, and L is the scarf length of the scarf faces 92$a$, 92$b$, in other words, the length of the line segment Lcv1 which can be obtained by the above-described Equation (12). In addition, the i is the scarf ratio of the scarf faces 92$a$, 92$b$, and also the ratio (i=Ls/t) of a projected length Ls in a direction along the fiber direction FD in the projection of the scarf faces 92$a$, 92$b$, on the virtual projection plane when viewed from one side of the thickness t of the veneer 90, and the thickness t. The projected length Ls is the square root of the value (Ls=√(L2−t2)) that is obtained by subtracting the square of the thickness t from the square of the scarf length L.

Equation (19) is a formula for the straight line Lt. Equation (20) is a formula for the X coordinates $x_7$ of the intersection point $P_7$ between the straight line Lt and the ellipse, which is obtained by using Equation (19) and Equation (9) for the ellipse. Equation (22) is a formula for the y intercept of Equation (19), that is, for the Y coordinates of the point $P_5$, which is obtained by using Equation (20) and Equation (21) that is a condition equation (discriminant) wherein the straight line Lt as a tangent to the ellipse. Equation (23) is a formula for the distance $h_3$ between the Y intercept $P_5$ of the straight line Lt and the intersection point $P_3$ between the ellipse and the Y axis (the distance $h_3$ is the length of the hypotenuse $P_7P_9$ of a triangle $P_7P_8P_9$).

Substitution of the angle $\alpha$ and the distance $h_3$ obtained from the Equations (15) and (23) into the Equation (14) leads to the value of the camber $h_1$ of the arc concavity 91.

In the scarfing machine 1 of the above modification also, a heeling angle $\theta_2$ is adjusted in order to obtain a desired camber $h_1$, and thereby scarf faces 92*a*, 92*b* can be machined in the veneer 90 at the heeling angle $\theta_2$. With the configuration, similar effects to those in the embodiment of the present invention are provided by the modification. For example, double cutting of the veneer 90 by the circular saw 20 (re-contacting of the blades 20*b* that machined the scarf faces 92*a*, 92*b* with the scarf faces 92*a*, 92*b*) can be well prevented; when the veneers 90 are joined together at the scarf faces 92*a*, 92*b*, the adhesive Ad can be well hindered from seeping out onto the surfaces of the veneers 90 (pocket effect); the scarf faces 92*a*, 92*b* can be properly joined together; and when the veneers 90 are joined to each other using a hot plate press, a hole Sh for appropriate steam release can be provided, which accelerates curing of the adhesive Ad.

According to the scarfing machine1 of the modification, at the tips of the thinnest scarf faces 92*a*, 92*b*, the fiber direction FD of the veneer 90 and the acting direction of the cutting force FC can be identical to each other (see FIG. 21), and thereby the resistance at the time of cutting can be reduced. As a result, the tips of the thinnest scarf faces 92*a*, 92*b* are unlikely to break.

In the present embodiment, the pair of machining units 10, 10 supported by the supporting units 12, 14 is fixed to the base 2, and the pair of holding units 6, 6 are moved in the transfer direction TD of the veneer 90 (the longitudinal direction of the frame 4), but the present invention is not limited to this configuration. For example, a configuration is possible in which the pair of holding units 6, 6 is fixed to the base 2 or the frame 4, and the supporting units 12, 14 supporting the pair of machining units 10, 10 are moved in the transfer direction TD of the veneer 90 (the longitudinal direction of the frame 4).

Figure 26:
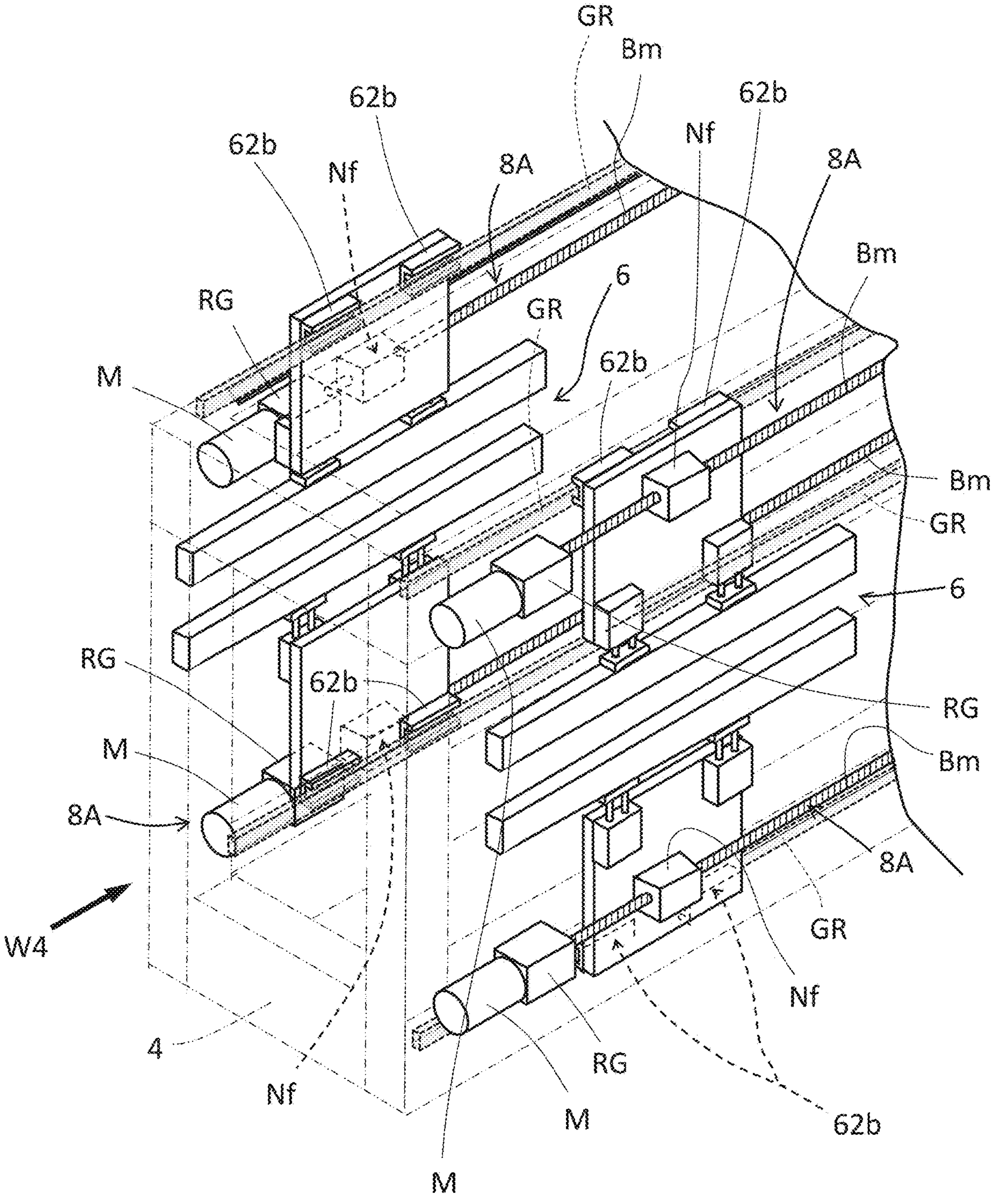
FIG. 26 is an enlarged perspective configuration diagram showing a schematic configuration of a drive section 8A of a modified example.
Figure 27:
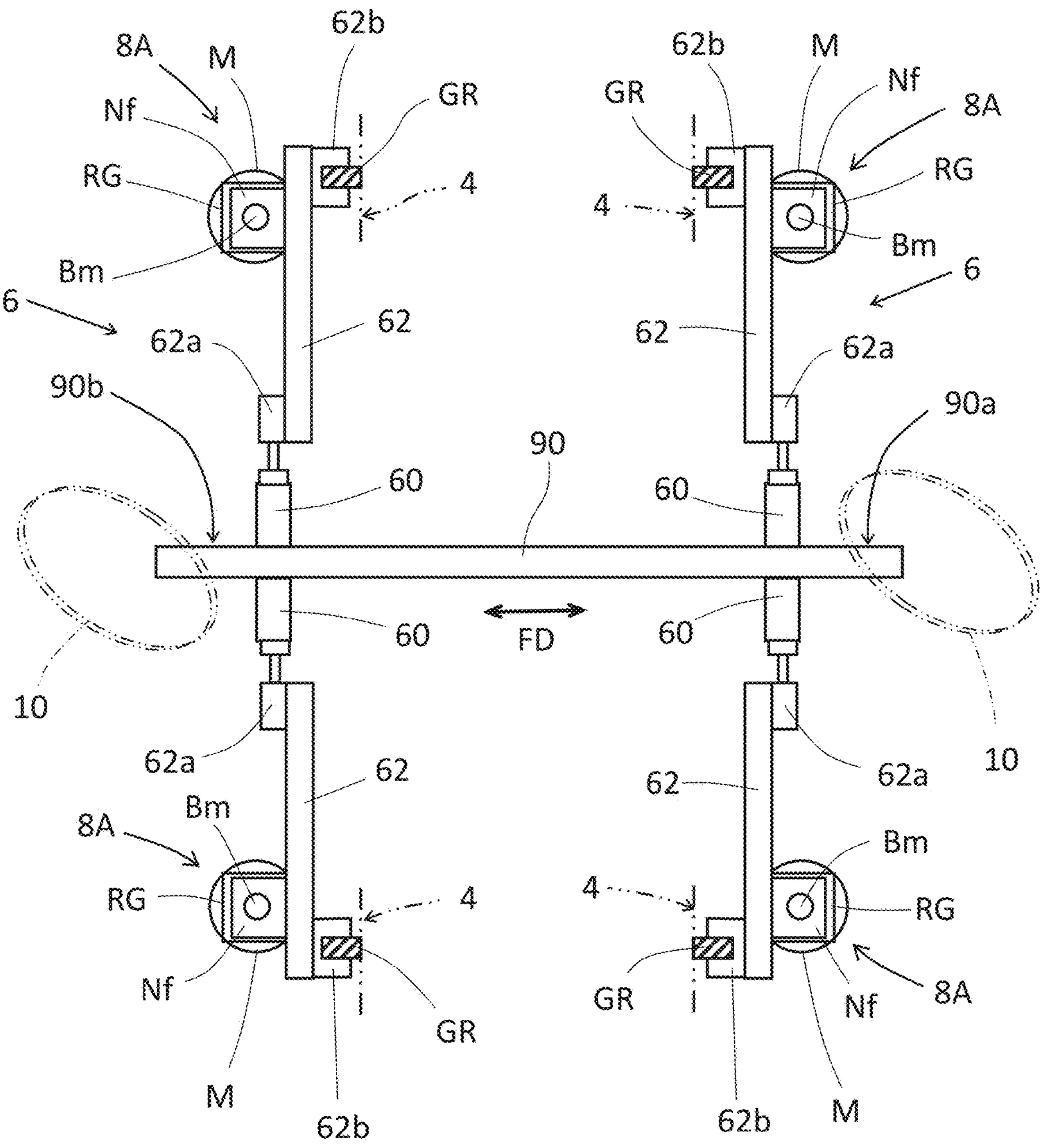
FIG. 27 is a diagram of FIG. 26 viewed in the direction of the arrow W4.

In the present embodiment, the driving unit 8 includes the endless belt BELT rotatably supported by the frame 4 via pulleys P, P, a gear mechanism RG (e.g., reduction gear) connected to a rotary shaft (not shown) of one of the pulleys, and a motor M connected to the rotary shaft (not shown) of the gear mechanism RG. Rotation of the endless belts BELT, BELT, BELT, BELT causes the pair of holding units 6, 6 fixed to the endless belts BELT, BELT, BELT, BELT to move in the transfer direction TD of the veneer 90 (the longitudinal direction of the frame 4), but the present invention is not limited to this configuration. For example, as a modified driving unit 8A shows in FIGS. 26 and 27, a configuration is possible in which a driving unit 8A includes a motor M supported by the frame 4, a gear mechanism RG (e.g., reduction gear) connected to a rotary shaft (not shown) of the motor M, a male threaded rod Bm connected to an output shaft (not shown) of the gear mechanism RG, and a female screw Nf engaged with the male threaded rod Bm. The male threaded rod Bm is rotatably supported by the frame 4, and the female screw Nf is fixed to the main plates 62, 62, 62, 62 of the pair of holding units 6, 6. The modified driving unit 8A is able to drive the motor M for forward and reverse rotation of the male threaded rod Bm, so that the pair of holding units 6, 6 is reciprocated in the transfer direction TD of the veneer 90 (the longitudinal direction of the frame 4) via the female screw Nf.

In the present embodiment, the clamping and releasing of the veneer 90 by the pair of upper and lower clamping bars 60, 60 is performed by the air cylinders 62*a*, 62*a*, 62*a*, 62, but the present invention is not limited to this configuration. For example, hydraulic cylinders may be used rather than the air cylinders 62*a*, 62*a*, 62*a*, 62*a*.

In the present embodiment, the reinforcing disc 24 is disposed only on the rear surface 21*b* of the circular saw 20, that is, on the side where the motor 22 is mounted, but another reinforcing disc 24 may be disposed on the front surface 21*a* of the circular saw 20 (see FIGS. 8 and 9), that is, on the side opposite the side where the motor 22 is mounted. With the configuration, the circular saw 20 can have a further enhanced stiffness against the bending force acting on it. The reinforcing disc 24 disposed on the front surface 21*a* of the circular saw 20 corresponds to the "second reinforcing disc" of the present invention, and the front surface 21*a* is one example of implemented configuration for the "second surface" of the present invention.

The present embodiment is an example of a form for carrying out the present invention. Therefore, the present invention is not limited to the configuration of the present embodiment. The corresponding relationship between each component of the present embodiment and each component of the present invention is shown below.

REFERENCE SIGNS LIST

1 Scarfing machine (Scarfing machine)
2 Base
4 Frame
6 Holding unit (Holding unit)
8 Driving unit (Driving unit)
8 Driving unit (Driving unit)
10 Machining unit (Machining unit)
12 Supporting unit (Supporting unit)
12*a* Tilting table
12*b* Supporting table
13 Slope
13*a* Long hole
14 Supporting unit (Supporting unit)
14*a* Tilting table
14*b* Supporting table
15 Slope
15*a* Long hole
16 Pressing unit (Pressing unit)
16*a* Slope
16*b* Curved surface
18 Pressing unit (Pressing unit)
18*a* Slope
18*b* Curved surface
20 Circular saw (Cutter)
20*a* Through hole
20*b* Blades (Blades)
21*a* Front surface (Second surface)
21*b* Rear surface (First surface)
22 Motor (Motor)
22*a* Rotary shaft (Rotary shaft)
24 Reinforcing disc (First reinforcing disc)
60 Clamping bar
62 Main plate
62*a* Air cylinder
62*b* Guide portion
62*c* Fixing unit
70 Carry-in conveyor
70*a* Carry-in roller
72 Carry-out conveyor
72*a* Carry-out roller
90 Veneer (board material)
90*a* Edge (Edge of board material)
90*b* Edge (Edge of board material)
91 Arc concavity (arc concavity)
92*a* Scarf face (scarf face)

92*b* Scarf face (scarf face)
GR Guide rail
BELT Endless belt
P Pulley
RG Gear mechanism
M Motor
BRKT Bracket
BLT Bolt
Bm Male threaded rod
Nf Femail screw
h Camber (Camber)
$h_1$ Camber (Camber)
$h_2$ Length of side $P_4P_6$
$h_3$ Distance between Y intercept $P_5$ of straight line Lt and intersection point $P_3$
Ad Adhesive
Sh Hole for steam release
L Scarf length, length of line segment Lcv1
t Thickness of veneer (thickness of board material)
R Diameter of circular saw (Diameter of cutter)
i Scarf ratio (Scarf ratio)
FD Fiber direction of veneer (Fiber direction of board material)
TD Transfer direction of veneer
VL Vertical line
$\theta_1$ Scarf angle (First tilt angle)
$\theta_2$ Heeling angle (Second tilt angle)
CLr Rotation axis of circular saw (Rotation axis of cutter)
Cr Center of ellipse (circular saw)
$P_1$ End of projection of arc concavity
$P_2$ End of projection of arc concavity
$P_3$ End of projection of arc concavity, intersection point between ellipse and Y axis
$P_4$ End of projection of arc concavity
$P_4$' End of projection of arc concavity
$P_5$ Y intercept of straight line Lt
$P_6$ Point forming the right angle of right triangle $P_3P_4P_6$
$P_7$ Intersection point between straight line Lt and ellipse
$P_8$ Intersection point between straight line passing through point $P_7$ and orthogonal to line segment Lcv1 and line segment Lcv1
$P_9$ Intersection point between straight line passing through point $P_7$ and parallel to line segment Lcv1 and line segment Lcv1
Lcv1 Line segment connecting points $P_1$ and $P_2$
Lcv2 Line segment passing through Point $P_2$ and parallel to Y axis
Svc Intersection point between line segment Lcv1 and Y axis
Ls length of the scarf face in projection
Fc Cutting force
Fcp Force component of cutting force
Lvh Vertical binated division of line segment Lcv1
$\alpha$ Angle
Cv Virtual circle having a radius L

The invention claimed is:

1. A scarfing machine for machining a scarf face at an edge of a wooden board material, the edge extending in a direction intersecting a fiber direction of the board material, the scarfing machine comprising:

a holding unit configured to hold the board material with at least the edge of the board material protruding;

a machining unit including a motor having a rotary shaft, and a disc cutter having a plurality of blades and connected to the rotary shaft, the machining unit positioned such that, on a virtual projection plane when viewed from one side of the extending direction of the edge of the board material, a projection of the edge of the board material intersects with a projection of the cutter;

a supporting unit configured to support the machining unit in a state where the cutter is tilted at a first tilt angle relative to the board material so as to obtain the scarf face of a desired scarf ratio and also where the cutter is tilted at a second tilt angle relative to the board material so as to set the cutter to tilt downward in the direction of machining the scarf face; and a driving unit mechanically connected to the holding unit or the supporting unit and configured to move the holding unit relative to the supporting unit or move the supporting unit relative to the holding unit along the extending direction of the edge of the board material, wherein the second tilt angle has a value calculated based on the relative positional relationship between a rotation axis of the cutter and the scarf face, a camber of the scarf face having an arc concavity, the scarf ratio, a diameter of the cutter, and a thickness of the board material.

2. The scarfing machine according to claim 1, wherein the machining unit is arranged such that the rotation axis of the cutter passes through the center of an arc length of the scarf face, and the second tilt angle has a value that satisfies the following Equation,

[Equation 1]

$$h = \frac{R}{2} \cdot \sin\theta_2 - \sqrt{\sin^2\theta_2 \cdot \frac{R^2 - t^2(1 + i^2)}{4}} \tag{1}$$

where $\theta_2$ is the second tilt angle, h is the camber desired, i is the scarf ratio desired, R is the diameter desired, and t is the thickness desired.

3. The scarfing machine according to claim 1, wherein the machining unit is arranged such that the rotation axis of the cutter passes through the tip of the scarf face, and the second tilt angle has a value that satisfies the following Equations (2) to (6),

[Equation 2]

$$h_1 = h_3 \cdot \cos\alpha \tag{2}$$

$$\alpha = \sin^{-1}\left(\frac{\frac{R}{2} \cdot \sin\theta_2 - y_4}{t^2(i^2 + 1)}\right) \tag{3}$$

$$y_4 = \frac{-R\sin\theta_2 + \sqrt{R^2\sin^2\theta_2 - 4\left(1 - \frac{1}{\sin^2\theta_2}\right)\left(\frac{R^2}{4}\sin^2\theta_2 + \frac{R^2}{4} - t^2(i^2 + 1)\right)}}{2\left(1 - \frac{1}{\sin^2\theta_2}\right)} \tag{4}$$

$$h_3 = |y_5| - \left|-\frac{R}{2} \cdot \sin\theta_2\right| \tag{5}$$

$$y_5 = -\frac{R}{2} \cdot \sqrt{\tan^2\alpha + \sin^2\theta_2} \tag{6}$$

where $\theta_2$ is the second tilt angle, h is the camber desired, i is the scarf ratio desired, R is the diameter desired, and t is the thickness desired.

4. The scarfing machine according to claim 1, wherein the plurality of blades is flat.

5. The scarfing machine according to claim 1, wherein the cutter has a first surface facing the board material and a second surface facing in the direction opposite to the first side, and the scarfing machine further includes a first reinforcing disc arranged in contact with the first surface.

6. The scarfing machine according to claim 5, further comprising:

a second reinforcing disc arranged in contact with the second surface.

7. The scarfing machine according to claim 1, further comprising:

a pressing unit positioned, in the vicinity of the cutter, upstream in the direction of machining the scarf face with respect to the cutter, the pressing unit being configured to press the board material.

8. A method of machining a scarf face at an edge of a wooden board material, the edge extending in a direction intersecting a fiber direction of the board material, the method comprising:

(a) holding the board material with at least an edge of the board material protruding;

(b) placing a disc cutter having a plurality of blades such that, on a virtual projection plane when viewed from one side of the extending direction of the edge of the board material, a projection of the edge of the board material intersects a projection of the cutter;

(c) calculating a second tilt angle of the cutter with respect to the board material, based on the positional relationship between the rotation axis of the cutter and the scarf face, a camber of the scarf face having an arc concavity, a scarf ratio of the scarf face, a diameter of the cutter, and a thickness of the board material;

(d) tilting the cutter relative to the board material by a first tilt angle such that the scarf face has a desired scarf ratio, and tilting the cutter relative to the board material at the second tilt angle such that the cutter is angled downward in the direction of machining the scarf face; and (e) relatively moving the board material and the cutter in the extending direction of the edge of the board material to machine the scarf face along the edge of the board material.

9. The method of machining a scarf face according to claim 8, wherein the step (b) includes a step of placing the cutter such that the rotation axis of the cutter passes through the center of an arc length of the scarf face, and the step (c) is a step for calculating the second tilt angle that satisfies the following Equation,

[Equation 3]

$$h = \frac{R}{2}\cdot\sin\theta_2 - \sqrt{\sin^2\theta_2\cdot\frac{R^2 - t^2(1+i^2)}{4}} \tag{7}$$

where $\theta_2$ is the second tilt angle, h is the camber desired, i is the scarf ratio desired, R is the diameter desired, and t is the thickness desired.

* * * * *